(12) United States Patent
Gutknecht et al.

(10) Patent No.: US 8,298,604 B2
(45) Date of Patent: *Oct. 30, 2012

(54) YOGURT-CHEESE COMPOSITIONS

(75) Inventors: Jon R. Gutknecht, Delray Beach, FL (US); John B. Ovitt, Franklin, VT (US)

(73) Assignee: Franklin Foods, Inc., Delray Beach, FL (US)

( * ) Notice: Subject to any disclaimer, the term of this patent is extended or adjusted under 35 U.S.C. 154(b) by 470 days.

This patent is subject to a terminal disclaimer.

(21) Appl. No.: 11/360,738

(22) Filed: Feb. 23, 2006

(65) Prior Publication Data

US 2006/0141096 A1    Jun. 29, 2006

Related U.S. Application Data

(63) Continuation-in-part of application No. 10/369,163, filed on Feb. 19, 2003, now Pat. No. 7,083,815, and a continuation-in-part of application No. PCT/US2004/002538, filed on Jan. 29, 2004, and a continuation-in-part of application No. 11/006,918, filed on Dec. 8, 2004, now Pat. No. 7,572,473, and a continuation-in-part of application No. 11/151,672, filed on Jun. 13, 2005, and a continuation-in-part of application No. PCT/US2005/044435, filed on Dec. 7, 2005.

(51) Int. Cl.
*A23C 17/00* (2006.01)

(52) U.S. Cl. ........... 426/583; 426/34; 426/580; 426/657

(58) Field of Classification Search .................... 426/34, 426/519, 520, 521, 580, 583, 656, 657
See application file for complete search history.

(56) References Cited

U.S. PATENT DOCUMENTS

| | | |
|---|---|---|
| 2,387,276 A | 10/1945 | Link |
| 2,436,498 A | 2/1948 | Strezynski |
| 4,194,011 A | 3/1980 | Invernizzi |
| 4,341,801 A | 7/1982 | Weissman |
| 4,397,878 A | 8/1983 | Koide |
| 4,518,616 A | 5/1985 | Czulak |
| 4,534,982 A | 8/1985 | Yoshida |
| 4,560,560 A | 12/1985 | Narimatsu |
| 4,569,846 A | 2/1986 | Ohzeki |
| 4,678,673 A | 7/1987 | Marshall |
| 4,732,769 A | 3/1988 | Sozzi |
| 4,980,179 A | 12/1990 | Koenraads |
| 5,009,867 A | 4/1991 | Kratochvil |
| 5,143,742 A | 9/1992 | Maroudas |
| 5,165,945 A | 11/1992 | Yee |
| 5,470,593 A | 11/1995 | Meilinger |
| 5,580,592 A | 12/1996 | Nassauer |
| 5,676,984 A | 10/1997 | Bohanan |
| 5,807,601 A | 9/1998 | Carpenter |
| 5,851,577 A | 12/1998 | Brenton |
| 5,882,704 A | 3/1999 | Yamaguchi |
| 5,916,608 A | 6/1999 | Lanting |
| 6,036,979 A | 3/2000 | Hormann |
| 6,096,870 A | 8/2000 | Mozaffar |
| 6,183,805 B1 | 2/2001 | Moran |
| 6,303,160 B1 | 10/2001 | Laye |
| 6,419,975 B1 | 7/2002 | Han |
| 6,485,762 B1 | 11/2002 | Rizvi |
| 6,558,716 B1 | 5/2003 | Kent |
| 6,572,901 B2 | 6/2003 | Han |
| 6,689,402 B1 | 2/2004 | Nauth |
| 6,861,080 B2 | 3/2005 | Kent |
| 6,982,100 B2 | 1/2006 | Swearingen |
| 7,083,815 B2 * | 8/2006 | Gutknecht et al. ............... 426/36 |
| 7,150,894 B2 | 12/2006 | Cha |
| 7,250,183 B2 | 7/2007 | Lindstrom |
| 7,258,886 B2 * | 8/2007 | Brue et al. ..................... 426/582 |
| 7,579,029 B2 | 8/2009 | Wolf-schoon |
| 7,582,326 B2 | 9/2009 | Brown |
| 7,585,537 B2 | 9/2009 | Merrill |
| 7,687,095 B2 | 3/2010 | Ma |
| 7,713,564 B2 | 5/2010 | Merrill |
| 2003/0219510 A1 | 11/2003 | Kent |
| 2005/0064067 A1 | 3/2005 | Schmitt |
| 2005/0084565 A1 | 4/2005 | Gutknecht |
| 2005/0180962 A1 | 8/2005 | Raz |
| 2005/0233049 A1 | 10/2005 | Gutknecht |
| 2006/0024412 A1 | 2/2006 | Cha |
| 2006/0246180 A1 | 11/2006 | Galal |
| 2007/0003666 A1 | 1/2007 | Gutknecht |

(Continued)

FOREIGN PATENT DOCUMENTS

DE    3314551 C1    11/1984

(Continued)

OTHER PUBLICATIONS

Ceming et al., "Isolation and Characterization of Exopolysaccharides from Slime-Forming Mesophilic Lactic Acid Bacteria," J.Dairy Sci., vol. 75 (1992), pp. 692-699.

(Continued)

*Primary Examiner* — Leslie Wong
(74) *Attorney, Agent, or Firm* — Jay M. Brown

(57) ABSTRACT

Technique for making a Low-Fat Yogurt-Cheese-Oil Composition, including: forming a milkfat-oil composition including a milkfat fluid and an oil; combining yogurt with the milkfat-oil composition to form a yogurt-milkfat-oil composition; combining milk protein with the yogurt-milkfat-oil composition; and forming a blend including the milk protein and the yogurt-milkfat-oil composition. Low-Fat Yogurt-Cheese-Oil Compositions.

23 Claims, 3 Drawing Sheets

U.S. PATENT DOCUMENTS

| | | | |
|---|---|---|---|
| 2007/0077332 | A1 | 4/2007 | Moran |
| 2008/0160133 | A1 | 7/2008 | Brooks |
| 2009/0041920 | A1 | 2/2009 | Eibel |
| 2009/0123601 | A1 | 5/2009 | Wolf-Schoon |
| 2010/0092608 | A1 | 4/2010 | Gutknecht |
| 2010/0098820 | A1 | 4/2010 | Imai |
| 2010/0143537 | A1 | 6/2010 | Solanes |
| 2011/0117242 | A1 | 5/2011 | Gutknecht |
| 2011/0268841 | A1 | 11/2011 | Gutknecht |

FOREIGN PATENT DOCUMENTS

| | | |
|---|---|---|
| EP | 0368492 A1 | 5/1990 |
| GB | 2290937 A | 1/1996 |
| IT | 1178926 | 9/1987 |
| WO | WO96/37114 | 11/1996 |
| WO | WO99/62348 | 12/1999 |

OTHER PUBLICATIONS

Kosin et al., "Microbial and Processing Criteria for Production of Probiotics: A Review," Mar. 2006, Food Technol. Biotechnol. vol. 44 No. 3 pp. 371-379.

U.S. Appl. No. 12/637,556, filed Dec. 14, 2009, Gutknecht.

Charteris et al., "Edible table (bio)spread containing potentially probiotic Lactobacillus and Bifidobacterium species," Int. J. Dairy Tech., Feb. 2002, vol. 55, No. 1, pp. 44-56.

Almecija et al., "A flux enhancing pretreatment for the ultrafiltration of acid whey," Desalination, vol. 246 (2009) pp. 364-369.

Westergaard, Vagn, "Milk Powder Technology—Evaporation and Spray Drying," Niro A/S, (2004), 337 pp.; published online at www.niro.com.

"Nutrients in Milk," downloaded on Jan. 11, 2011 from www.dairyforall.com; 2 pp.

"U.S. Whey Exports," downloaded on Feb. 22, 2011 from www.fas.usda.gov; (updated May 2, 2003); 4 pp.

"Utilization of Whey," downloaded on Jan. 11, 2011 from www.dairyforall.com; 1 p.

"Whey," downloaded on Jan. 11, 2011 from www.dairyforall.com; 2 pp.

"Whey Protein Concentrates," downloaded on Jan. 11, 2011 from www.dairyforall.com; 2 pp.

"Reference Manual for U.S. Whey and Lactose Products," U.S. Dairy Export Council; downloaded on Feb. 23, 2011 from www.usdec.org (publication date unknown); 226 pp.

Daschner, F. et al., "Optimization of the microwave determination of water in foods using principal component analysis," Instrumentation and Measurement Technology Conference 2000 (IMTC 2000; Proceedings of the 17th IEEE), May 1-4, 2000, vol. 1 pp. 12-16; [Abstract Only, 1 p.].

GEA Niro Method No. A 9 b, "Total Fat by Gerber/Teichert", revised Sep. 2005, published on-line at www.niro.com; 2 pp.

"Protein Determination: Protein Nitrogen Content of Milk—Kjeldahl Method (Direct Method)", Jun. 1991, published online by the United States Department of Agriculture at www.fmmaseattle.com; 11 pp.

Davis, J.G., "Yogurt Cheese," The Milk Industry, Apr. 1971, pp. 8-11.

"Composition of Different Species of Milk," downloaded on Dec. 20, 2011 from www.dairyforall.com; 1 p.

Commonly-owned U.S. Appl. No. 11/453,941, filed on Jun. 15, 2006, (32 pages).

Supplementary European Search Report: cover sheet; "Documents considered to be relevant"; and "Annex." Published on May 19, 2011 in European patent application No. 05853377.9 (3 pages).

International Search Report published on Aug. 21, 2006 in PCT/US05/44435 (8 pages).

Commonly-owned U.S. Appl. No. 13/037,292, filed on Feb. 28, 2011, (41 pages).

Commonly-owned U.S. Appl. No. 13/341,434, filed on Dec. 30, 2011, (35 pages).

Commonly-owned U.S. Appl. No. 13/341,497, filed on Dec. 30, 2011, (32 pages).

Commonly-owned U.S. Appl. No. 13/341,563, filed on Dec. 30, 2011, (34 pages).

Supplementary European Search Report: cover sheet; "Documents considered to be relevant"; and "Annex." Published on Dec. 21, 2011 in counterpart European patent application No. 06772970.7 (3 pages).

\* cited by examiner

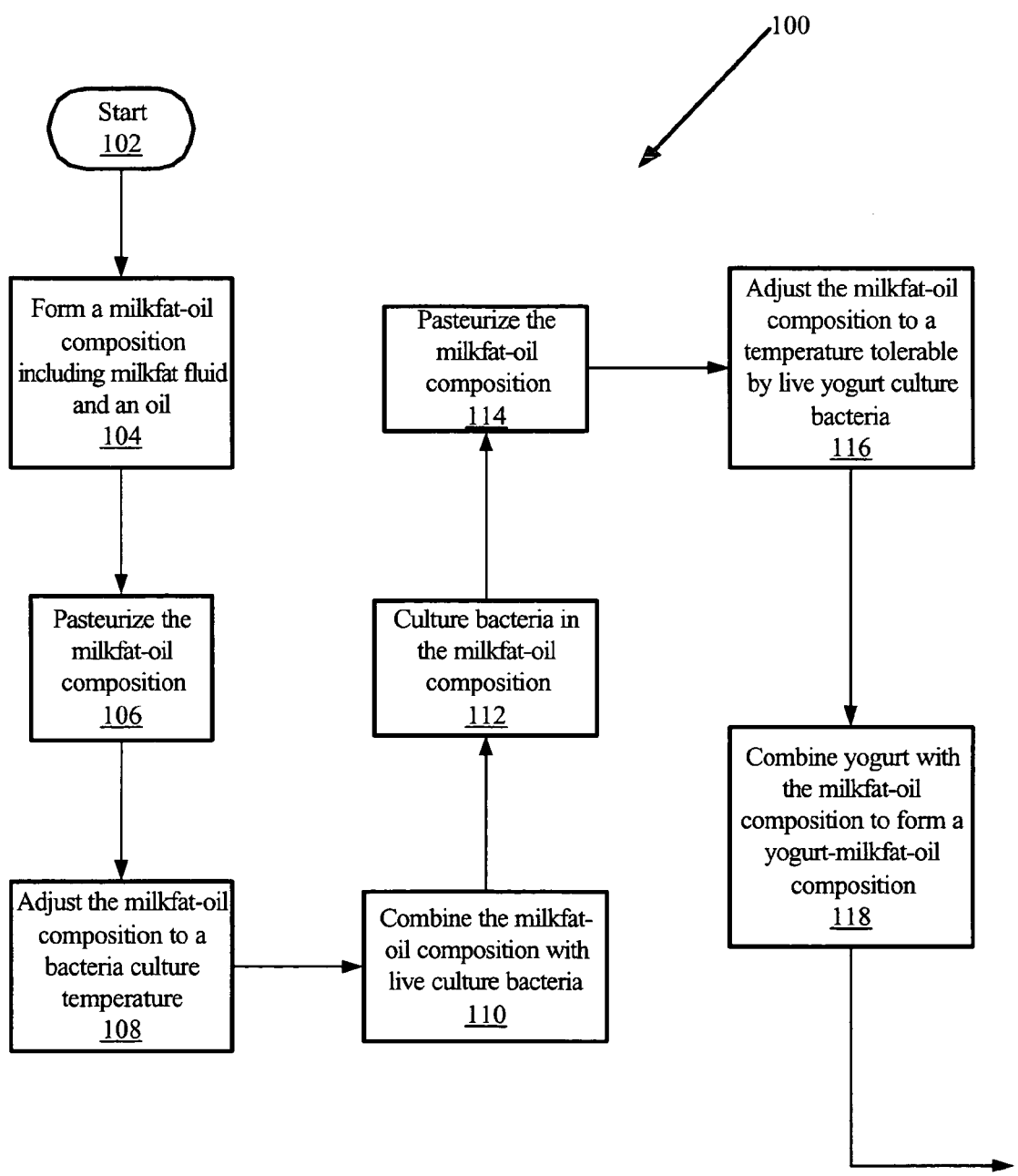
*FIG. 1-A*

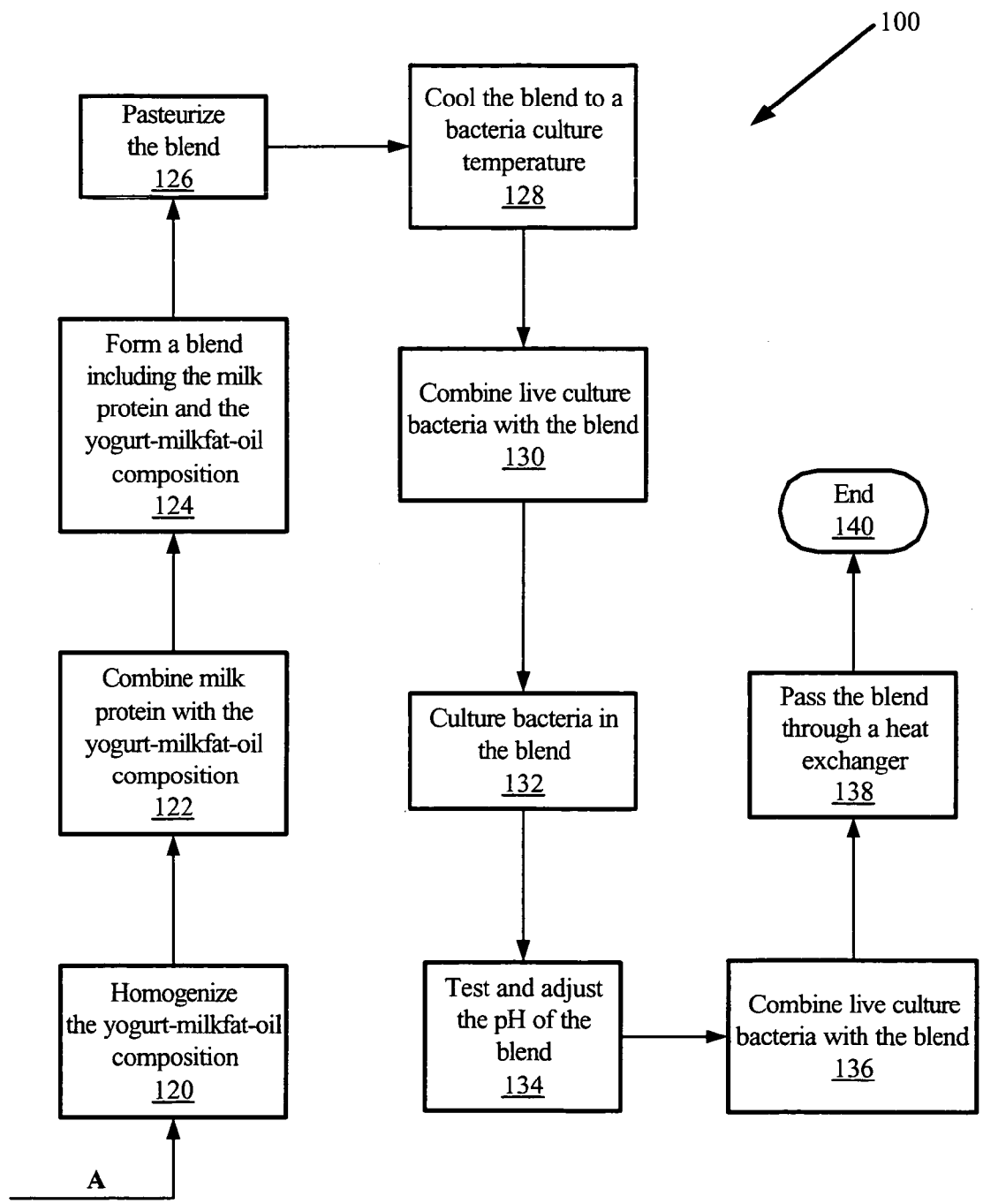
FIG. 1-B

YOGURT-CHEESE COMPOSITIONS

PRIORITY CLAIM

Cross Reference to Related Applications

This application is a continuation in part of commonly owned U.S. patent application Ser. No. 10/369,163, filed on Feb. 19, 2003, now U.S. Pat. No. 7,083,815; and a continuation in part of commonly owned Patent Cooperation Treaty Application Serial No. PCT/US2004/002538, filed on Jan. 29, 2004; and a continuation in part of commonly owned U.S. patent application Ser. No. 11/006,918, filed on Dec. 8, 2004, now U.S. Pat. No. 7,572,473; and a continuation in part of commonly owned U.S. patent application Ser. No. 11/151,672, filed on Jun. 13, 2005; and a continuation in part of commonly owned Patent Cooperation Treaty Application Serial No. PCT/US2005/044435, filed on Dec. 7, 2005. This application claims priority to each of these prior applications and all of such prior applications are hereby incorporated by reference into this application in their entirety.

BACKGROUND OF THE INVENTION

1. Field of the Invention

The invention relates to the field of cheese products and methods for making the same.

2. Related Art

Cream cheese and similar products are ubiquitous in modern diets. These cheese products generally have a creamy texture and a bland, unremarkable flavor. Spreadability makes cream cheese convenient to use, which is the primary basis for its choice by consumers over other firmer cheeses and the reason for its high volume consumption as a topping, for example on breads including bagels. In the classic method for making cream cheese, a pasteurized milkfat fluid such as cream, having a butterfat concentration generally within a range of between about 34.5% by weight and 52% by weight, is the primary raw material. This milkfat fluid is subjected to thorough digestion by lactic acid-producing bacteria, homogenized, and clotted by enzymes or direct acidification. The milkfat fluid is thus transformed into a solid phase referred to as the curd, and a liquid phase referred to as the whey. Most of the butterfat from the milkfat fluid is retained in the curd; and significant protein content, having substantial nutritional value and much of the appealing potential flavor in the milkfat fluid, remains in the whey. The curd is then processed into the cream cheese product, and the whey is discarded, along with its nutrients and flavor. As a result, cream cheese typically has a bland, dull, virtually unnoticeable taste. The retention of some of the liquid whey in the curd is a problem in itself, as the liquid gradually leaks out of the curd in an unappealing and ongoing separation that is called syneresis. In addition, large scale cream cheese production generates corresponding quantities of often unusable whey, which thus becomes a waste expense and environmental detraction unless some other use can be found for it. Syneresis can similarly be a problem in many other cheese products.

The minimum fat content for cream cheese is 33% by weight. It is a pervasive goal in the human diet to consume less fat; and the relatively high butterfat content of a typical cream cheese is not helpful in achieving this goal. Cream cheese may also include high concentrations of cholesterol and sodium. High fat concentrations are also a problem in many other cheese products.

The maximum fat content for low-fat cream cheese is 17.5% by weight. Countless attempts have been made to make low-fat cream cheese products, but the resulting cheese products have typically failed due to unacceptable taste and poor texture. As an example, some so-called low-fat cream cheese products have exhibited a bitter aftertaste, a glossy appearance, and a somewhat dry, plastic texture. Hence, despite the broad popularity of cream cheese, its use typically entails consumer acceptance of a minimum butterfat content of 33% by weight, along with high concentrations of cholesterol and sodium, and a bland, unremarkable taste.

Yogurt, which is another highly prevalent milk-derived product, has an entirely different consistency than cream cheese, as well as a fundamentally different flavor. In illustration, yogurt is considered to be a food, whereas cream cheese is considered to be a condiment. For example, cream cheese is a popular topping for bread products such as bagels, but yogurt is not. On the other hand, yogurt has a robust, appealing flavor. Yogurt also typically has lower concentrations of butterfat, cholesterol and sodium than cream cheese as well as a higher concentration of protein.

A health-conscious consumer might well make the simple observation that nonfat yogurt has a robust, appealing flavor, find the concept of combining yogurt and cream cheese to be appealing, and thus attempt to combine these products together. However, due to the disparate properties of cream cheese and yogurt, including for example their differing consistencies, water content, and food chemistries, combining cream cheese and yogurt in mutually appreciable proportions may only generate a runny mess or an unstable composition exhibiting marked syneresis over a reasonable storage period. A consumer might instead attempt to drain the liquid from the solid phase of the yogurt before combining in the cream cheese, thereby discarding whey including protein from the yogurt. Similar problems can be expected where other types of cheeses are substituted for cream cheese, if an attempt is made to combine such cheeses with yogurt.

In addition to cream cheese, many other currently-available cheese-like dairy products also lack the health benefits of yogurt. For example, butter products in the form of either spreads or bricks often have high butterfat concentrations. Further for example, margarine products, which are designed to substitute for butter, often have high edible oil concentrations. Neither of these product classes may typically include a substantial concentration of protein. As a further example, butter-like products including both butterfat and an edible oil may have a high overall fat concentration.

Accordingly there is a continuing need for low-fat cheese products including a milkfat fluid, having the appealing texture and flavor of high-milkfat cheeses.

SUMMARY

In one implementation, a process for making a Low-Fat Yogurt-Cheese-Oil Composition is provided, including: forming a milkfat-oil composition including a milkfat fluid and an oil; combining yogurt with the milkfat-oil composition to form a yogurt-milkfat-oil composition; combining milk protein with the yogurt-milkfat-oil composition; and forming a blend including the milk protein and the yogurt-milkfat-oil composition.

In another example, a Low-Fat Yogurt-Cheese-Oil Composition is provided, including: butterfat at a concentration within a range of between about 17.5% by weight and about 6% by weight; oil at a concentration within a range of between about 20% by weight and about 5% by weight; yogurt at a concentration within a range of between about 30% by weight and about 10% by weight; and milk protein at a concentration within a range of between about 30% by weight and about 5% by weight; yielding less than about 1% syneresis by weight after 15 hours at about 74° F. to about 75° F.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood with reference to the following figures. The components in the figures are not necessarily to scale, emphasis instead being placed upon illustrating the principles of the invention. Moreover, in the figures, like reference numerals designate corresponding parts throughout the different views.

FIG. 1 is a flow chart showing an example of an implementation of a process 100 for making a Low-Fat Yogurt-Cheese-Oil Composition ("Low-Fat Yogurt-Cheese-Oil Composition").

DETAILED DESCRIPTION

Figure 2:
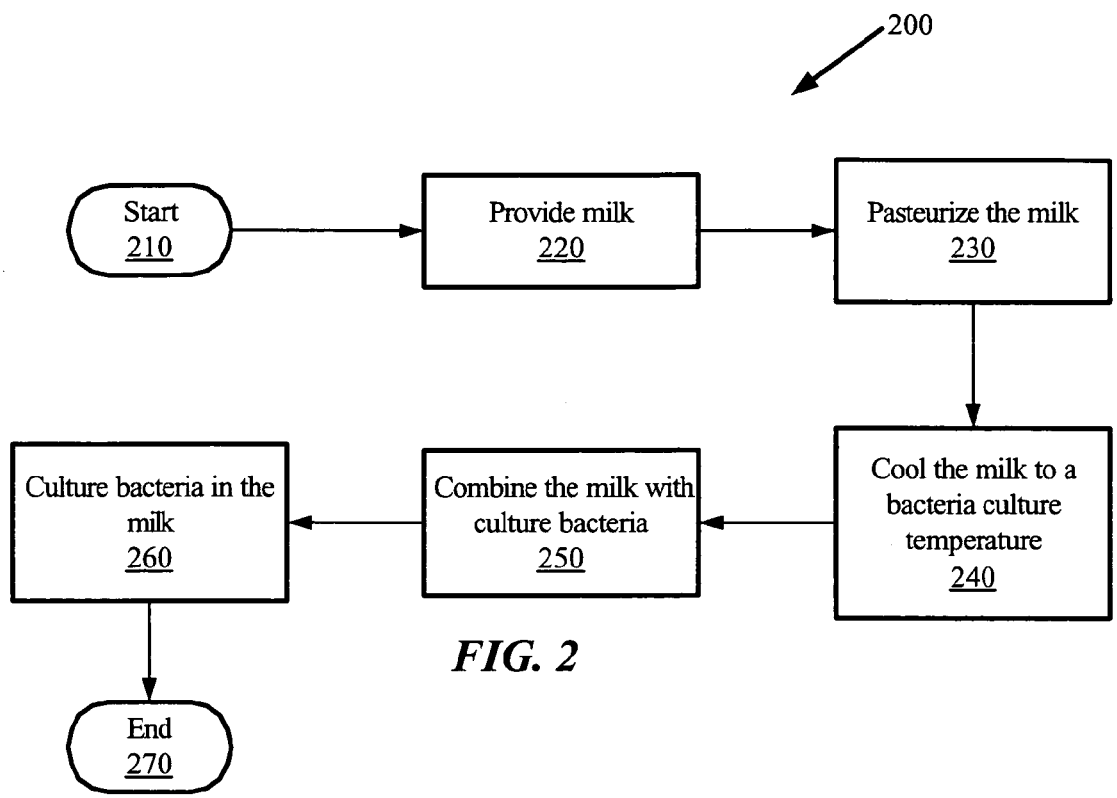
FIG. 2 is a flow chart showing an implementation of an example of a process 200 for preparing a yogurt to be utilized in step 118 of FIG. 1.

FIG. 1 is a flow chart showing an example of an implementation of a process 100 for making a Low-Fat Yogurt-Cheese-Oil Composition ("Low-Fat Yogurt-Cheese-Oil Composition"). The process starts at step 102. In step 104, a composition that includes a milkfat fluid and an edible oil ("milkfat-oil composition") may be prepared. Throughout this specification, the term "milkfat" refers to a composition including fatty components of edible milk, for example, cow milk. These fatty components, commonly referred to collectively as butterfat, may include, as examples, triacylglycerols, diglycerides, monoacylglycerols, other lipids, and mixtures.

Throughout this specification, the term "fluid" refers to a liquefied composition including milkfat, which may as examples be directly derived from milk or reconstituted by hydrating a dehydrated milk product. In an implementation, the milkfat fluid may include cream. As examples, a milkfat fluid may be formulated from one or more sources, including for example, whole milk, cream, skim milk, and dry milk.

Throughout this specification, the term "oil" refers to an edible oil of vegetable or animal origin or of both vegetable and animal origin. In an implementation, a vegetable oil derived from seeds or fruit of one or more of the following may be utilized: soy, corn, canola, sunflower, safflower, olive, peanut, cottonseed, sesame, almond, apricot, avocado, coconut, flax, grapeseed, hazelnut, palm, pine, poppy, pumpkin, rice bran, tea, walnut, and wheat. As another example, an animal oil including one or more of the following may be utilized: lard, shortening, suet, and tallow.

As an example, an edible oil that may reduce a serum cholesterol level in a consumer may be utilized. In an implementation, palm oil may so reduce a serum cholesterol level. In another example, an edible oil may be useful for preparing a Low-Fat Yogurt-Cheese-Oil Composition having a creamy texture. Edible oils, however, may be substantially 100% fat. Hence, the combination of an edible oil with a milkfat fluid at step 104 may generate a milkfat-oil composition having a higher fat concentration than that of the milkfat fluid itself. As an example, discussed below, combining milk protein with the milkfat fluid at step 104 or step 122 or both may reduce an overall fat concentration of the Low-Fat Yogurt-Cheese-Oil Composition.

In an implementation, a stabilizer may be combined with the milkfat-oil composition at step 104. Combining a stabilizer with the milkfat-oil composition may thicken the milkfat-oil composition, as an example by binding water. The stabilizer may also contribute to binding together of the milkfat-oil composition ingredients. This thickening may result in increased retention of whey protein in the milkfat-oil composition during subsequent steps of the process 100. Combining into the milkfat-oil composition a selected stabilizer having a water binding capability that effectively facilitates inclusion of a higher concentration of water may also yield a Low-Fat Yogurt-Cheese-Oil Composition having a more creamy texture. In another example (not shown), a stabilizer may be combined with the milkfat-oil composition following completion of bacteria culture in steps 108-112 discussed below. As another implementation, a stabilizer may be combined with the milkfat-oil composition at a different point in the process 100 that is prior to combination of yogurt with the milkfat-oil composition in step 118 discussed below. In a further implementation, a stabilizer may be combined with the milkfat-oil composition at a later point in the process 100. As an example, a stabilizer may be combined with the milkfat-oil composition prior to homogenization at step 120 discussed below, so that any lumpy texture in the milkfat-oil composition resulting from combining the milkfat-oil composition and stabilizer may be minimized by homogenization at step 120. In another implementation, a stabilizer may be combined with a yogurt-milkfat-oil composition at step 122 discussed below.

The stabilizer may be selected from, as examples, gums, salts, emulsifiers, and their mixtures. Gums that may be suitable include, as examples, locust bean gum, xanthan gum, guar gum, gum arabic, and carageenan. In an implementation, salts that may be suitable include sodium chloride and potassium chloride. These salts may, as an example, be introduced in suitable concentrations as flavorings for the Low-Fat Yogurt-Cheese-Oil Composition. Emulsifiers that may be suitable include, as examples, sodium citrate, potassium citrate, mono-, di-, and tri-sodium phosphate, sodium aluminum phosphate, sodium tripolyphosphate, sodium hexametaphosphate, dipotassium phosphate, and sodium acid pyrophosphate. In an implementation, the stabilizer may include K6B493. The stabilizer K6B493 may be in the form of a milled, dry product commercially available from CP Kelco US, Inc., 1313 North Market Street, Wilmington, Del. 19894-0001. As another example, the stabilizer that is utilized may include a distilled glyceride produced by the distillation of mono-glycerides themselves produced by esterification of a triglyceride and glycerol. In an implementation, a variety of stabilizers may be obtained through choices of triglycerides and a selected concentration of monoglyceride. Distilled glycerides that may be suitable include those commercially available from Danisco USA Inc. under the trade name, DIMODAN®. Gum arabic may be commercially available from TIC Gums Inc., Belcamp, Md. As an example, a stabilizer blend including xanthan gum, locust bean gum and guar gum may be commercially available from TIC Gums Inc. Gum-based stabilizers may contain sodium. In an implementation, this sodium may be taken into account in selecting ingredients for making a Low-Fat Yogurt-Cheese-Oil Composition in order to avoid an excessively high overall sodium concentration. As an example, a stabilizer composition that does not include sodium may be selected. In another implementation, the incorporation of a significant proportion of yogurt into the Low-Fat Yogurt-Cheese-Oil Composition may reduce the overall sodium concentration, as the yogurt may itself have a low sodium concentration.

In an example, a concentration of a stabilizer may be selected that is effective to cause a moderate thickening of the milkfat-oil composition. In an implementation, a stabilizer may be combined with the milkfat-oil composition in an amount to constitute a concentration within a range of between about 0.2% by weight and about 0.5% by weight of the Low-Fat Yogurt-Cheese-Oil Composition. In another implementation, a stabilizer may be introduced in an amount to constitute a concentration of about 0.45% by weight of the Low-Fat Yogurt-Cheese-Oil Composition. As an example, as the butterfat content of a selected milkfat-oil composition may be relatively reduced, a concentration of a stabilizer to be utilized may be proportionally increased.

In an implementation, a milk protein may be combined in a small concentration with the milkfat-oil composition at step 104. As examples, the milk protein may include: milk protein concentrate, whole milk protein, whey protein concentrate, casein, Baker's cheese, yogurt powder, dry cottage cheese curd, milk protein curd, or a mixture. In an implementation, the milk protein may help increase the thickness of the milkfat-oil composition in order to reduce any tendency for separation of the milkfat-oil composition into butterfat, milk protein and edible oil phases to occur. Milk protein concentrate may be produced, as an example, by ultrafiltration of milk. Whey protein compositions having protein concentrations of about 30% by weight, about 50% by weight, and about 85% by weight, as examples, may be commercially available. In an implementation, a milk protein may be combined into the milkfat-oil composition at a resulting concentration within a range of between about 1% by weight and about 15% by weight. As a further example, a milk protein may be combined into the milkfat-oil composition at a resulting concentration within a range of between about 5% by weight and about 9% by weight. In an additional implementation, a milk protein may be combined into the milkfat-oil composition at a resulting concentration of about 7% by weight.

As an example, the milkfat-oil composition may include a concentration of an edible oil (weight/weight as a fraction of the milkfat-oil composition) within a range of between about 3% and about 70%; and a weight/weight concentration of a milkfat fluid within a range of between about 97% by weight and about 30% by weight. In another implementation, the milkfat-oil composition may include a weight/weight concentration of an edible oil within a range of between about 3% and about 40%, the balance being milkfat fluid. As a further example, the milkfat-oil composition may include a weight/weight concentration of an edible oil within a range of between about 5% and about 27%, the balance being milkfat fluid. In an additional implementation, the milkfat-oil composition may include a weight/weight concentration of an edible oil within a range of between about 8% and about 11%, the balance being milkfat fluid.

In an implementation, the milkfat fluid may have a butterfat content within a range of between about 10% and about 52% by weight. As another example, the milkfat fluid may have a butterfat content within a range of between about 34.5% and about 52% by weight. In a further implementation, the milkfat fluid may have a butterfat content within a range of between about 33% and about 50% by weight. As an additional example, the milkfat fluid may have a butterfat content within a range of between about 39% and about 50% by weight. In another example, the milkfat fluid may have a butterfat content within a range of between about 40% and about 44% by weight. In yet another implementation, the milkfat fluid may have a butterfat content within a range of between about 17% and about 33% by weight.

In an implementation, the milkfat fluid may have a water content within a range of between about 40% and about 70% by weight. As an example, heavy cream may have a butterfat content of about 37% by weight, a protein content of about 2% by weight, and a water content of about 58% by weight, with the balance made up by other milk solids. Butterfat may be a major ingredient in cheese, as butterfat may be coagulated together with proteins and other ingredients into a curd and further processed to produce cheese. The term "cheese" as utilized throughout this specification is broadly defined as a milkfat fluid that has been at least partially digested by culture bacteria, or otherwise coagulated.

In an implementation, the milkfat-oil composition may be pasteurized at step 106. Prior to this step, the milkfat-oil composition may carry a wild bacteria load as is normally present in raw milk products. Pasteurization of the milkfat-oil composition is required at some point in order to kill these wild bacteria, as well as other wild microbes, to an extent reasonably feasible. Furthermore, if the milkfat-oil composition is to be subjected to culture bacteria in steps 108-112 or steps 128-132 discussed below, pasteurization needs to be completed in advance of those steps or the wild bacteria in the raw milkfat-oil composition will typically digest and thereby spoil the composition. Where a source of pre-pasteurized milkfat fluid is employed, further pasteurization at this point may be unnecessary.

Pasteurization causes irreversible heat-induced denaturation and deactivation of bacteria. Effective pasteurization is a function of both time and temperature; pasteurization may be completed at higher temperatures in correspondingly shorter times. In one implementation, pasteurization of the milkfat-oil composition in step 106 may be carried out in a vat process at a temperature of about 150° Fahrenheit ("F") for about 30 minutes; or about 165° F. for about 15 minutes; or if a more strenuous process is selected, about 170° F. for about 30 minutes. Other time and temperature treatment parameters that may be effective are known; and substitution of high surface area contact methods for the vat process may permit shorter effective treatment times. High temperature short time pasteurization for example, in which the milkfat-oil composition may be pumped through an in-line tube within a temperature-controlled shell, may be used. Milkfat fluids having relatively high butterfat content may require more heat exposure than low butterfat fluids in order to obtain effective pasteurization. Further background information on pasteurization of milk is provided in the Grade "A" Pasteurized Milk Ordinance published on May 15, 2002 by the U.S. Food & Drug Administration, particularly at pages 62 and 63; the entirety of which is hereby incorporated herein by reference.

Agitation may be provided and may be initiated prior to the heating process during pasteurization to facilitate more even heating throughout the milkfat-oil composition and to avoid localized overheating. The force applied by the agitation may be moderated to avoid strong shearing, which may degrade proteins, butterfat, and oil in the milkfat-oil composition. In an example, pasteurization may be carried out in a tank equipped with a heater and agitator. Any such vessel may generally be used, such as, for example, a Groen kettle.

In an alternative implementation, an edible oil may be combined with the milkfat fluid at a later point in the process 100. As an example, an edible oil may be combined with the milkfat fluid prior to initiation of blending at step 124 discussed below, so that blending may result in a Low-Fat Yogurt-Cheese-Oil Composition having a substantially uniform texture. In another example, step 106 may be omitted.

In an implementation, the temperature of the milkfat-oil composition may be adjusted at step 108 to a bacteria culture temperature. As an example, the temperature of the milkfat-oil composition may be adjusted to within a range of between about 65° F. and about 92° F. In an additional implementation, the temperature of the milkfat-oil composition may be adjusted to within a range of between about 70° F. and about 85° F. In yet a further example, the temperature of the milkfat-oil composition may be adjusted to about 82° F. In another example, step 108 may be omitted.

As an example, culture bacteria may be combined with the milkfat-oil composition at step 110, and then cultured at step 112. These steps may generate robust culture-induced flavor in the milkfat-oil composition. Milk contains lactose sugars that may be digested by selected bacteria, producing lactic acid, glucose and galactose as metabolites. Hence, the culture bacteria generally may be selected from among those that can digest lactose. In an example, a strain of mesophilic bacteria suitable for culturing cheese may be used. Such bacteria strains may be chosen, as an example, to produce diacetyl flavor. Bacteria strains may require ongoing rotational use, to prevent background bacteriophage populations from becoming resistant to a particular strain of bacteria, which may result in shutdown of the culture process and contamination of the Low-Fat Yogurt-Cheese-Oil Composition during its production. For example, the culture bacteria may be selected from varying combinations of strains, which may be rotated on an ongoing basis, of (1) lactic acid-producing *Lactococcus lactis* subspecies *lactis* or subspecies *cremoris*; and (2) diacetyl flavor-producing *Lactococcus lactis* subspecies *diacetylactis* or *Leuconostoc* strains. Bacteria strains that may be suitable are commercially available under the trade name pHage Control™ from Chr. Hansen, Bøge Allé 10-12, DK-2970Hørsholm, Denmark. Grades 604 and 608, as examples, may be effective. These particular bacteria strain blends may be used continuously without rotation, provided that proper sanitation is maintained. Further bacteria strains that may be suitable are commercially available under the trade names Flav Direct™ and DG™ Cultures from Degussa BioActives, 620 Progress Avenue, P.O. Box 1609, Waukesha, Wis. 53187-1609.

Once a culture bacteria strain or strain mixture is selected, an amount may be combined with a given batch of milkfat-oil composition that may be effective to propagate live cultures throughout the batch in a reasonable time at the chosen culture temperature. For example, 500 grams of bacteria may be effective to inoculate up to 7,500 pounds of milkfat-oil composition using an inoculation proportion of about 0.015% by weight. As an example, an inoculation proportion within the range of between about 0.013% by weight and about 0.026% by weight may be used. In general, greater proportional inclusions of culture bacteria in a milkfat-oil composition batch may lead to somewhat reduced processing time, at the expense of increased costs for the bacteria.

In an implementation, the milkfat-oil composition may be agitated during or following the introduction of the culture bacteria. The culture bacteria may be combined in a small proportion compared with the milkfat-oil composition, and hence may need to be dispersed so that they may act throughout the milkfat-oil composition. Agitation may begin, as an example, prior to introduction of the culture bacteria, and may be continued after dispersion of the culture bacteria. The shear force applied by the agitation may be selected to be sufficient to disperse the culture bacteria in a reasonable time, but not so strong as to substantially shear and thus degrade the culture bacteria or the proteins, butterfat and oil in the milkfat-oil composition. As an example, moderate agitation of the milkfat-oil composition containing the culture bacteria may be continued for a time period within a range of between about 10 minutes and about 25 minutes. In another implementation, moderate agitation may be continued for about 15 minutes.

In step 112, the culture bacteria, if introduced at step 110, may be cultured in the milkfat-oil composition. In an implementation, the milkfat-oil composition may be held at a suitable temperature long enough for cultures of the selected bacteria to begin development, resulting in a slight thickening of the milkfat-oil composition. The necessary duration of such bacteria culturing depends on a variety of factors including, as examples, the level of bacteria activity, the selected culture temperature, the initial bacteria concentration, and the ingredients in the milkfat-oil composition. The culture bacteria may digest lactose sugars in the milk. High culture temperatures and high initial bacteria concentrations may generally shorten the culture time needed. The culture temperature employed, however, must be within a range tolerable to the survival and growth of the selected culture bacteria. In an example, the milkfat-oil composition may be cultured with the selected bacteria for a time period within a range of between about 60 minutes and about 90 minutes. A bacteria culture step of such a limited duration may generate a mild thickening of the milkfat-oil composition. In another example, steps 108-112 may be omitted.

In an implementation, the milkfat-oil composition may be pasteurized at step 114. As an example, pasteurization step 114 may be carried out as discussed above in connection with step 106. In an implementation, the milkfat-oil composition may be pasteurized at step 114 before the bacteria culture of step 112 has caused any substantial thickening of the milkfat-oil composition to occur. This pasteurization at step 114 may thus terminate bacteria culture step 112. Very little change in the pH of the milkfat-oil composition may occur in such a mild bacteria culture step. As an example, limiting the bacteria culture of step 112 to a mild thickening of the milkfat-oil composition in this manner may be a fundamental and major departure from a typical process for the production of cream cheese. In a typical process for the production of cream cheese, bacteria culture may be permitted to run its course until a pH of a milkfat fluid may be reduced to within a range of between about 5.0 and about 4.1.

In a further implementation, a temperature of the milkfat-oil composition may be gradually raised during steps 104-114, so that pasteurization may be initiated at step 114 in due course when the milkfat-oil composition reaches an effective pasteurization temperature. In another example, step 114 may be omitted.

In another implementation, bacteria culture at step 112 may be continued for a sufficient time to partially or substantially digest the milkfat-oil composition, as may be limited by an attendant reduction of the pH toward an endpoint where bacteria activity may markedly decrease. Lactic acid may be formed as a byproduct of metabolism of lactose by the bacteria in step 112. Hence, a measured pH of the milkfat-oil composition, which may gradually decline with lactic acid buildup, may be an indication of the progress of the bacteria culture. In an example, bacteria culture at step 112 may be continued until the pH of the milkfat-oil composition may be within a range of between about 5.0 and about 4.1. As another implementation, bacteria culture at step 112 may be continued until the pH of the milkfat-oil composition may be within a range of between about 4.6 and about 4.4. The bacteria activity may become substantially dormant within either of these pH ranges.

In an implementation, the milkfat-oil composition may be adjusted at step 116 to a temperature suitable for subsequent combination of yogurt together with the milkfat-oil composition at step 118. In an example, the temperature of the milkfat-oil composition may promptly be lowered, following completion of pasteurization at step 114, to a more moderate level in order to minimize ongoing heat damage to butterfat, milk proteins and oil as well as any other components of the milkfat-oil composition. As another implementation, the temperature of the milkfat-oil composition may be lowered to a more moderate level following completion of pasteurization at step 114 so as not to unduly shock or kill beneficial culture bacteria present in the yogurt during combination of the yogurt with the milkfat-oil composition at step 118 as discussed below. If the yogurt is exposed to a temperature suitable for pasteurization, the beneficial yogurt bacteria may be killed.

As a further example, the milkfat-oil composition may be cooled at step 116 to a temperature suitable for carrying out further steps of the process 100. In an implementation, the milkfat-oil composition may be cooled at step 116 to a temperature within a range of between about 110° F. and about 128° F. As another example, the milkfat-oil composition may be cooled at step 116 to a temperature within a range of between about 115° F. and about 128° F. The milkfat-oil composition may be cooled at step 116 in an additional implementation to a temperature within a range of between about 120° F. and about 125° F. As a further example, the milkfat-oil composition may be cooled at step 116 to a temperature of about 125° F. In another implementation, the milkfat-oil composition may be cooled at step 116 to a refrigeration temperature such as a temperature within a range of between about 34° F. and about 38° F., and may then be temporarily stored prior to further processing.

Following the completion of some or all of steps 104-116 as discussed above, the milkfat-oil composition may be combined together with yogurt at step 118. As an example, the milkfat-oil composition resulting from some or all of steps 104-116 of the process 100 may be a uniform material that may include butterfat, whey protein, and an edible oil among its ingredients. In an implementation, steps 104-116 of the process 100 may not include a direct acidification step. Direct acidification of the milkfat-oil composition prior to its combination with yogurt at step 118 may cause the curd and whey of the milkfat-oil composition to separate from each other. This separation may inhibit the incorporation of whey protein, such as whey protein from the milkfat fluid, into the Low-Fat Yogurt-Cheese-Oil Composition. Whey protein may generally become separated in liquid form from the curd in conventional cream cheese production, the curd essentially constituting the product. Hence, the milkfat-oil composition that may result from completion of some or all of steps 104-116 and that may have not been subjected to direct acidification, is not a cream cheese. As an example, substitution of cream cheese for the milkfat-oil composition as an ingredient in step 118 may decrease a maximum concentration of whey protein that may be incorporated into the Low-Fat Yogurt-Cheese-Oil Composition. Further, the direct combination together of cream cheese and yogurt in mutually substantial proportions may not yield a homogenous single-phase product. Substitution of other conventional cheeses for the milkfat-oil composition may similarly inhibit incorporation of whey protein into the Low-Fat Yogurt-Cheese-Oil Composition.

In an implementation (not shown), a conventional cheese such as cream cheese may be combined as an ingredient into the Low-Fat Yogurt-Cheese-Oil Composition. As an example, conventional cream cheese may be combined with the milkfat-oil composition at step 118 or at another point in the process 100, in a selected concentration. As the concentration of conventional cheese in the Low-Fat Yogurt-Cheese-Oil Composition is increased, the overall fat concentration of the Low-Fat Yogurt-Cheese-Oil Composition may accordingly increase as well.

In an implementation, the milkfat-oil composition and a yogurt may be combined together at step 118 to form a yogurt-milkfat-oil composition. As an example, any yogurt may be utilized. Yogurt may be broadly defined as a milkfat fluid that has been cultured by at least one bacteria strain that is suitable for production of yogurt. In an implementation, a yogurt may be utilized that includes: butterfat at a concentration within a range of between about 0% and about 3.25% by weight; milk protein at a concentration within a range of between about 3% and about 6% by weight; and water at a concentration within a range of between about 76% and about 88% by weight. In another example, a yogurt may be utilized that includes: butterfat at a concentration within a range of between about 0.5% and about 3.25% by weight; milk protein at a concentration within a range of between about 3.47% and about 5.25% by weight; and water at a concentration within a range of between about 76% and about 88% by weight. As a further implementation, a yogurt may be utilized that includes: butterfat at a concentration within a range of between about 0.5% and about 2.0% by weight; milk protein at a concentration of about 5% by weight; and water at a concentration of about 85% by weight. A yogurt may be utilized in another example that includes: butterfat at a concentration of about 0.16% by weight; milk protein at a concentration of about 5.12% by weight; and water at a concentration of about 76% by weight. In an implementation, a yogurt may be utilized having a total solids content of at least about 8% by weight.

FIG. 2 is a flow chart showing an implementation of an example of a process 200 for preparing a yogurt to be utilized in step 118 of FIG. 1. Referring to FIG. 2, the process 200 starts at step 210, and milk for preparing the yogurt may be provided at step 220. The milk selected for preparing the yogurt may be, as examples, whole milk, reduced fat milk, or skim milk. Butterfat present in the milk may facilitate the process 200, as butterfat may contribute to the feasibility of thickening the yogurt to a selected consistency. However, butterfat present in the milk that is utilized to prepare the yogurt also contributes to the overall fat concentration in the Low-Fat Yogurt-Cheese-Oil Composition. In an implementation, skim milk may be utilized in step 220, in order to reduce the overall fat concentration of the Low-Fat Yogurt-Cheese-Oil Composition. As another example, milk having a butterfat content of less than about 1% by weight may be utilized. In a further implementation, the selected milk may be liquid milk such as cow milk, or the milk may be reconstituted from dry milk.

In an implementation, a solids concentration of the milk to be utilized in preparing the yogurt may be standardized to within a range of between about 18% and about 22% by weight. In another implementation, the solids concentration of the milk may be standardized to about 22% by weight. As an example, if the solids concentration of the milk is substantially in excess of 22% by weight, the bacteria culture utilized to prepare the yogurt may digest the milk too slowly for completion of the process 200 within a reasonable time period. In a further example, a robust bacteria strain may be selected or the milk may be inoculated with an extra high bacteria load, to facilitate utilization of milk having a relatively high solids concentration. In another implementation, the solids concentration of the milk may be standardized to within a range of between about 10% and about 12% by weight, as may be selected in a conventional process for the preparation of yogurt. As an example, however, such a relatively low solids concentration may hinder production of a Low-Fat Yogurt-Cheese-Oil Composition having an acceptably thick texture. In an implementation, an initial solids concentration of milk selected for utilization at step 220 may be increased to a selected higher concentration by any process suitable to yield a condensed milk. As an example, a condensation process that does not involve heating the milk, such as an ultrafiltration process, may be utilized in order to minimize resulting degradation of the milk.

At step 230, the milk may be pasteurized. In an implementation, this pasteurization may be carried out as earlier discussed with regard to step 106. As an example, pasteurization of the milk may be carried out by maintaining the milk at a temperature of at least about 165° F. for at least about 15 minutes. In another implementation, pasteurization of the milk may be carried out by maintaining the milk at a temperature of about 170° F. for about 30 minutes. As a further example, the milk may be agitated during the pasteurization, which may facilitate more uniform heating of the milk and may avoid its localized overheating.

At step 240, the milk may be cooled to a bacteria culture temperature. As an example, the temperature of the milk may be promptly reduced to a moderate level following completion of its pasteurization in order to reduce ongoing heat damage of the milk. In another example, the milk may not be maintained at the high temperatures necessary for pasteurization when bacteria may be cultured in the milk at steps 250-260 discussed below, or the bacteria may not survive. In an implementation, the milk may be cooled at step 240 to a temperature within a range of between about 90° F. and about 115° F. In another example, the milk may be cooled at step 240 to a temperature within a range of between about 106° F. and about 110° F. As an additional implementation, the milk may be cooled at step 240 to a temperature of about 108° F.

At step 250, culture bacteria may be combined with the milk. In an implementation, bacteria strains that may be suitable for the preparation of yogurt may be utilized. As examples, *Lactobacillus delbrueckii* subspecies *bulgaricus, Streptococcus thermophilus, Lactobacillus acidophilus, Bifidobacterium*, and *Lactobacillus paracasei* subspecies *casei* may be utilized. As another implementation, other lactic acid-producing bacteria strains that may be suitable for preparing yogurt may be utilized. Yogurt culture bacteria strains that may be suitable are commercially available under the trade name. Yo-Fast® from Chr. Hansen, Bøge Allé 10-12, DK-2970Hørsholm, Denmark. The bacteria strain F-DVS YoFast®-10 as an example, which may contain blended strains of *Streptococcus thermophilus, Lactobacillus delbrueckii* subspecies *bulgaricus, Lactobacillus acidophilus, Bifidobacterium*, and *Lactobacillus paracasei* subspecies *casei*, may be utilized. In another implementation, DVS YoFast®-2211 may be utilized. As an additional implementation, a yogurt culture including *Lactobacillus acidophilus, Bifidobacterium*, and *L. casei* may be utilized. In an example, Yo-Fast® 20 cultures that may include mixtures of *Lactobacillus acidophilus, Bifidobacterium*, and *L. casei*, may be utilized. Such yogurt cultures may develop a very mild flavor and may contribute to an appealing texture in the Low-Fat Yogurt-Cheese-Oil Composition. These yogurt cultures may also make possible a reduction in a needed concentration of or possibly an elimination of stabilizers that may otherwise be needed for increasing the thickness of the composition to an adequate, appealing level. These yogurt cultures may require minimal direct acidification, which may result in a longer shelf life for the Low-Fat Yogurt-Cheese-Oil Composition. Such yogurt cultures may also lend an appealing mouth feel and creaminess to the Low-Fat Yogurt-Cheese-Oil Composition. In another implementation, further bacteria strains that may be suitable are commercially available under the trade names Ultra-Gro® and Sbifidus® from Degussa BioActives, 620 Progress Avenue, P.O. Box 1609, Waukesha, Wis. 53187-1609.

In an implementation, step 250 may include combining a selected culture bacteria strain with the milk at a bacteria concentration that is effective to propagate live bacteria cultures throughout a given batch of milk in a reasonable time at a selected culture temperature. As an example, a relatively higher concentration of culture bacteria may correspondingly reduce the time period needed to complete step 250, but at the expense of increased costs for the bacteria.

In an implementation, the milk may be agitated during all or part of step 250, as the concentration of the culture bacteria may be small compared with that of the milk. As an example, the culture bacteria may be actively dispersed throughout the milk. In another implementation, agitation may be initiated before the culture bacteria are combined with the milk, and agitation may also be continued after the culture bacteria have been dispersed in the milk. In an example, a shear force of the agitation may be sufficient to disperse the culture bacteria in a reasonable time, but may not be so strong as to degrade the culture bacteria, or the proteins and butterfat in the milk. In an implementation, the milk and culture bacteria may be subjected to moderate agitation for a time period within a range of between about 10 minutes and about 25 minutes. As another example, the milk and culture bacteria may be subjected to moderate agitation for a time period of about 15 minutes.

In step 260, bacteria introduced at step 250 may be cultured in the milk. In an implementation, the milk may be maintained at a temperature suitable for cultures of the selected bacteria to develop, over a time period sufficient so that a visible curd may form throughout the milk. The visible curd may be accompanied by a substantial thickening of the milk. As an example, the milk may be maintained for a selected time period at a temperature within a range of between about 95° F. and about 112° F. In another implementation, the milk may be maintained for a selected time period at a temperature within a range of between about 100° F. and about 110° F. As a further example, the milk may be maintained for a selected time period at a temperature within a range of between about 106° F. and about 110° F. In an additional implementation, the milk may be maintained for a selected time period at a temperature of about 108° F. In an example, an optimum duration of the bacteria culturing may depend on the level of bacteria activity, the selected culture temperature, the initial bacteria concentration, and the composition of the milk. In an implementation, the milk may be cultured with selected bacteria for a time period within a range of between about 4 hours and about 6 hours. As another example, the milk may be cultured with selected bacteria at a temperature of about 108° F. for about 6 hours.

Lactic acid may be formed as a byproduct of metabolism of lactose by the bacteria in step 260. Hence, a measured pH of the milk, which may gradually decrease with lactic acid buildup, may be an indication of the progress of the bacteria culture toward completion. In an implementation, when a pH of the milk reaches about 4.4, the level of bacteria activity may begin to markedly decrease. As an example, the bacteria culture in step 260 may be continued until a pH of the milk is within a range of between about 5.0 and about 4.1. In another implementation, the bacteria culture step 260 may be continued until a pH of the milk is within a range of between about 4.6 and about 4.4. As a further example, the bacteria culture step 260 may be continued until a pH of the milk is about 4.5.

When the milk reaches a selected pH, the process 200 may end at step 270. The resulting product is yogurt that may contain live culture bacteria. As an example, the yogurt may have a uniform consistency and a solids content of at least about 8% by weight.

Returning to step 118 of FIG. 1, the milkfat-oil composition and yogurt may be combined together to form a yogurt-milkfat-oil composition. In an implementation, the yogurt and the milkfat-oil composition may be simultaneously prepared so that some or all of steps 118-138 of the process 100 discussed below may then immediately be carried out. As an example, yogurt prepared according to the process 200 discussed above may already be at a suitable temperature for its combination with the milkfat-oil composition at step 118. In an implementation, the milkfat-oil composition may have already been cooled at step 116 to that same temperature or to another compatible temperature.

In an implementation, yogurt may be prepared in advance of carrying out any or all of steps 104-116 of the process 100. As an example, yogurt may be prepared prior to preparing a composition including milkfat fluid and edible oil in step 104, and may then be cooled to a refrigeration temperature to retard continuation of bacteria activity in the yogurt until selected steps from among steps 104-116 of the process 100 have been executed. In an implementation, the yogurt may be so cooled to a temperature within a range of between about 34° F. and about 38° F., and then may be reheated. As an example, the yogurt may be so reheated to a temperature within a range of between about 95° F. and about 112° F. In another implementation, the yogurt may be so reheated to a temperature within a range of between about 100° F. and about 110° F. As a further example, the yogurt may be reheated to a temperature within a range of between about 106° F. and about 110° F. In an additional implementation, the yogurt may be reheated to a temperature of about 108° F. As an example, yogurt may be prepared while or after some or all of steps 104-116 are carried out, so that the yogurt may be directly combined with the milkfat-oil composition at step 118 without reheating. Directly combining yogurt and the milkfat-oil composition at step 118 without reheating the yogurt may minimize degradation of the yogurt that may be caused by such reheating, including precipitation of the curd, attendant syneresis, and a reduction in the concentration of live culture bacteria.

Ambient air may contain bacteria that may be harmful to and cause degradation of the milkfat-oil composition and the yogurt. In an implementation, the milkfat-oil composition and yogurt may be handled in a manner to minimize their exposure both during and after their preparation to ambient air, as well as to minimize the exposure of the yogurt-milkfat-oil composition to ambient air.

As an example, the preparations of the milkfat-oil composition and the yogurt to be combined together at step 118 may be completed substantially at the same time. In an implementation, the respective temperatures of the milkfat-oil composition and the yogurt may be selected and controlled with attention to preserving live culture bacteria in the yogurt, to minimizing further heating and cooling operations, and to preventing shock to or death of the live yogurt culture bacteria. In another example, live yogurt bacteria cultures, which themselves may provide well-known health benefits to the consumer, may be included in the Low-Fat Yogurt-Cheese-Oil Composition. As a further implementation, the temperature of the milkfat-oil composition and the temperature of the yogurt may each be adjusted if such temperatures are found to be too hot or too cold. In another example, the temperature of the milkfat-oil composition and the temperature of the yogurt may be adjusted, before combining them together, to within a range of between about 110° F. and about 128° F., and to within a range of between about 95° F. and about 112° F., respectively. As an additional implementation, the temperature of the milkfat-oil composition and the temperature of the yogurt may be adjusted, before combining them together, to within a range of between about 115° F. and about 128° F., and to within a range of between about 100° F. and about 110° F., respectively. In a further example, the temperature of the milkfat-oil composition and the temperature of the yogurt may be adjusted, before combining them together, to within a range of between about 120° F. and about 125° F., and to within a range of between about 100° F. and about 108° F., respectively. As another implementation, the temperature of the milkfat-oil composition and the temperature of the yogurt may be adjusted, before combining them together, to temperatures of about 125° F. and about 108° F., respectively.

In an implementation, relative concentrations of milkfat-oil composition and yogurt to be combined at step 118 may be selected. As an example, the milkfat-oil composition may contain a higher concentration of butterfat than does the yogurt. As another example, the yogurt may contain lower concentrations of cholesterol and sodium, and a higher concentration of milk protein, than the milkfat-oil composition. In another implementation, combining a substantial concentration of yogurt with the milkfat-oil composition may provide a robust flavor, a reduced concentration of cholesterol, and healthful active culture bacteria to the Low-Fat Yogurt-Cheese-Oil Composition. In an example, a sufficient concentration of yogurt may be combined into a given batch of milkfat-oil composition to yield a selected substantial improvement in the flavor of the Low-Fat Yogurt-Cheese-Oil Composition and to yield a selected concentration of healthful active culture bacteria in the composition.

In an implementation, the yogurt-milkfat-oil composition formed at step 118 may include yogurt at a resulting concentration within a range of between about 10% and about 50% by weight, and a milkfat-oil composition at a concentration within a range of between about 50% by weight and about 90% by weight. As a further example, the yogurt-milkfat-oil composition formed at step 118 may include yogurt at a resulting concentration within a range of between about 15% and about 30% by weight, and a milkfat-oil composition at a concentration within a range of between about 85% by weight and about 70% by weight. In another implementation, the yogurt-milkfat-oil composition formed at step 118 may include yogurt at a resulting concentration within a range of between about 18% and about 22% by weight, and a milkfat-oil composition at a concentration within a range of between about 82% by weight and about 78% by weight. As an additional example, the yogurt-milkfat-oil composition formed at step 118 may include yogurt at a resulting concentration of about 20% by weight, and a milkfat-oil composition at a concentration of about 80% by weight. In a further implementation where the Low-Fat Yogurt-Cheese-Oil Composition may include a flavoring, the yogurt-milkfat-oil composition formed at step 118 may include yogurt at a resulting concentration within a range of between about 23% and about 30% by weight, and a milkfat-oil composition at a concentration within a range of between about 77% by weight and about 70% by weight. As another example where the Low-Fat Yogurt-Cheese-Oil Composition may include a flavoring, the yogurt-milkfat-oil composition formed at step 118 may include yogurt at a resulting concentration of about 27% by weight.

In an implementation, the milkfat-oil composition and the yogurt may be combined together at step 118 within a reasonable time following completion of some or all of steps 104-116 discussed above. As another example, the milkfat-oil composition and the yogurt may be separately prepared and stored, provided that excessive bacteria activity or heat-induced degradation is not permitted to take place in either of these ingredients over an extended time period before they are combined together in step 118.

In an implementation, step 118 may include thoroughly mixing together the milkfat-oil composition with the yogurt. As an example where the concentration of yogurt may be smaller than the concentration of the milkfat-oil composition, the yogurt may be combined with the milkfat-oil composition in order to carry out step 118. In an implementation, the mixing may be carried out in a vessel having an agitator. As an example, the milkfat-oil composition and the yogurt may be combined together with moderate agitation for a selected time period. As another example, care may be taken to select an agitation level that may effectively mix the milkfat-oil composition and yogurt together but that may also minimize shearing of milk proteins, butterfat, oil molecules, and live culture bacteria. In an implementation, mixing may be continued over a time period within a range of between about 10 minutes and about 30 minutes. As an further example, mixing may be continued over a time period of about 15 minutes. Thorough mixing together of the yogurt and milkfat-oil composition at step 118, prior to homogenization at step 120 discussed below, may lead to a more uniform consistency in the Low-Fat Yogurt-Cheese-Oil Composition.

In an implementation, a vessel utilized for carrying out step 118 may include heating and cooling exchangers suitable for adjusting and controlling a temperature of the yogurt-milkfat-oil composition to a selected temperature. As another example, the yogurt-milkfat-oil composition prepared at step 118 may be maintained at a temperature within a range of between about 118° F. and about 125° F. In a further implementation, the yogurt-milkfat-oil composition prepared at step 118 may be maintained at a temperature within a range of between about 118° F. and about 120° F.

The arrow A shows that step 120 follows step 118 in FIG. 1. At step 120, the yogurt-milkfat-oil composition may be homogenized by subjecting the yogurt-milkfat-oil composition to an elevated pressure for a selected period of time, and then rapidly releasing the pressure. In an example, application of such an elevated pressure may break down butterfat globules in the yogurt-milkfat-oil composition and substantially reduce their potential for subsequent recombination and agglomeration, so that a yogurt-milkfat-oil composition having a substantially uniform texture may be prepared. As a further example, application of such an elevated pressure may cause butterfat, edible oil and milk protein to be thoroughly interdispersed, so that a yogurt-milkfat-oil composition having a substantially reduced potential for syneresis and for separation of the edible oil may be prepared. As an implementation, homogenization may be carried out at an elevated pressure applied to the yogurt-milkfat-oil composition by any suitable means, such as, for example, hydraulic or mechanical force. As another example, the yogurt-milkfat-oil composition may be compressed to a selected pressure and then passed through an orifice to quickly reduce the pressure.

In an implementation, the homogenization at step 120 may be carried out at a relatively high temperature. As an example, the fluidity of the yogurt-milkfat-oil composition may increase at higher temperatures, which may improve the efficiency of the homogenization process. In an implementation, live and active yogurt bacteria may not be able to survive at a temperature greater than about 128° F., and temperatures above about 125° F. may result in gradual death of such bacteria. As an example, the homogenization in step 120 may be carried out at a selected and controlled temperature that is not in excess of about 125° F. In another implementation, homogenization in step 120 may be carried out at a selected and controlled temperature that is within a range of between about 118° F. and about 125° F. As a further example, homogenization in step 120 may be carried out at a selected and controlled temperature that is within a range of between about 118° F. and about 120° F. As an example, a temperature for the homogenization process may be selected that will not kill a substantial proportion of the live culture bacteria in the yogurt-milkfat-oil composition prepared at step 118. In an implementation, homogenization may be carried out in a Gaulin homogenizer.

In an implementation, homogenization may be carried out at a pressure within a range of between about 2,000 pounds per square inch (PSI) and about 4,000 PSI. As another example, homogenization may be carried out at a pressure within a range of between about 2,500 PSI and about 3,200 PSI. In a further implementation, a thickness of the Low-Fat Yogurt-Cheese-Oil Composition may increase as the pressure applied during homogenization at step 120 increases. As an example, a pressure to be applied to the yogurt-milkfat-oil composition during homogenization may be selected to yield a Low-Fat Yogurt-Cheese-Oil Composition having a selected consistency.

As an example, step 120 may be carried out using a homogenizer having a homogenization chamber, an inlet chamber, and an outlet chamber. The inlet chamber may in an example be a vessel suitable for staging a supply of the yogurt-milkfat-oil composition, on a continuous or batch basis, for introduction into the homogenization chamber. In an implementation, the homogenization chamber may be a vessel having controllable orifices for input and output of the yogurt-milkfat-oil composition, and may be reinforced to withstand containment of an elevated pressure suitable for homogenization. As a further example, the outlet chamber may be a vessel suitable for staging a supply of the homogenized yogurt-milkfat-oil composition, on a continuous or batch basis, for execution of some or all of steps 122-138 discussed below. In an implementation, the yogurt-milkfat-oil composition may be passed through the inlet chamber before being pumped into the homogenization chamber. Following homogenization, the yogurt-milkfat-oil composition may, as an example, be expelled from the homogenization chamber into the outlet chamber. These flows may, as examples, be carried out on a continuous or batch basis. As a further implementation, the pressure within the homogenization chamber may be adjusted to a selected homogenization pressure and maintained at that pressure during homogenization. In an example, the pressure in the inlet chamber may be within a range of between about 20 PSI and about 40 PSI. The pressure may be generated, as an implementation, by pumping of the yogurt-milkfat-oil composition into the inlet chamber. As another example, the pressure in the outlet chamber may be within a range of between about 20 PSI and about 40 PSI. The pressure may be generated, as an implementation, by expelling the yogurt-milkfat-oil composition from the homogenization chamber and then containing it in the outlet chamber. The yogurt-milkfat-oil composition may, as an example, undergo a pressure drop by ejection of the composition through a hole upon passing from the homogenization chamber to the outlet chamber. In an implementation, such a hole may have a diameter of about a centimeter. As an additional example, the pressures within the inlet chamber, the outlet chamber, and the homogenization chamber may be selected and carefully controlled so that air may not be entrained into the homogenization chamber. In an example, such entrained air may cause cavitation, which may degrade the yogurt-milkfat-oil composition and may lead to an explosive release of the homogenization pressure.

In an implementation, milk protein may be combined with the yogurt-milkfat-oil composition at step 122. As examples, the milk protein may include: milk protein concentrate, whole milk protein, whey protein concentrate, casein, Baker's cheese, yogurt powder, dry cottage cheese curd, milk protein curd, or a mixture. A whey protein concentrate having a protein concentration of about 30% by weight, about 50% by weight, or about 85% by weight, as examples, may be utilized. As an example, the milk protein may include live and active culture bacteria. As skim milk, a condensed skim milk or a high protein condensed skim milk dressing, as examples, may be utilized. In an implementation, a milk protein may be combined with the yogurt-milkfat-oil composition at a resulting concentration within a range of between about 45% by weight and about 15% by weight. As a further example, a milk protein may be combined with the yogurt-milkfat-oil composition at a resulting concentration within a range of between about 40% by weight and about 25% by weight. As another implementation, a milk protein may be combined with the yogurt-milkfat-oil composition at a resulting concentration of about 24.5% by weight. Combining a milk protein with the yogurt-milkfat-oil composition at step 122 may, as an example, facilitate incorporation of a higher overall concentration of water into the Low-Fat Yogurt-Cheese-Oil Composition. Milk protein may, however, have an unappealing flavor and texture. As an example, milk protein may have a strong, unpleasant, astringent flavor. In another example, milk protein may have a lumpy, grainy texture.

In an implementation, combining yogurt with the milkfat-oil composition at step 118 of the process 100 may counteract and minimize adverse effects of combining a milk protein with the yogurt-milkfat-oil composition at step 122 while making possible the preparation of a Low-Fat Yogurt-Cheese-Oil Composition having a reduced overall fat concentration compared with cream cheese. As an example, the yogurt may provide the Low-Fat Yogurt-Cheese-Oil Composition with an appealing flavor and a creamy, moist texture in spite of the inclusion of the milk protein. As a further example, certain of the edible oils discussed in connection with step 104 may contribute appealing taste and texture to the Low-Fat Yogurt-Cheese-Oil Composition. In another implementation, certain of the edible oils may therapeutically reduce serum cholesterol levels in consumers. As an example, combination with the milkfat fluid of an edible oil at step 104, yogurt at step 118, and a milk protein at step 122 may collectively facilitate production of a Low-Fat Yogurt-Cheese-Oil Composition that may have attributes including a low overall fat concentration, appealing taste and texture, and therapeutic utility in cholesterol reduction.

In an implementation, step 122 may include standardizing the milk protein and the yogurt-milkfat-oil composition to a selected overall fat concentration. As another example, the projected fat concentration of the Low-Fat Yogurt-Cheese-Oil Composition to be prepared from the milk protein and the yogurt-milkfat-oil composition in further steps of the process 100 may also be determined, based on the selected concentrations of yogurt-milkfat-oil composition and milk protein to be combined, and based on the overall fat concentration in the yogurt-milkfat-oil composition. In an implementation, low-fat cream cheese may be defined to include a maximum fat concentration of 17.5% by weight. Given the variable nature of raw milk, standardization of the fat content in a given batch of milk protein and yogurt-milkfat-oil composition may also be useful, as an example, in furtherance of stability of the process 100 and of preparation of a uniform Low-Fat Yogurt-Cheese-Oil Composition. In an implementation, the overall fat concentration of the milk protein and the yogurt-milkfat-oil composition formed at step 122 may be adjusted to within a range of between about 10% and about 40% by weight. As another example, the overall fat concentration of the yogurt-milkfat-oil composition may be adjusted to within a range of between about 17% and about 25% by weight. In a further implementation, the overall fat concentration of the yogurt-milkfat-oil composition may be adjusted to within a range of between about 20% and about 21% by weight. As an additional example, the overall fat concentration of the yogurt-milkfat-oil composition may be adjusted to about 20.71% by weight.

As an example, the texture and mouth feel of cheese products may improve with higher overall fat content. The fat content of the yogurt-milkfat-oil composition may include the edible oil and butterfat from the milkfat fluid, as an example. In an implementation, a high overall fat content may provide better tolerance of the milk protein and the yogurt-milkfat-oil composition to processing steps, such as agitation shear that may degrade protein, butterfat and oil molecules. However, a high overall fat concentration in the milk protein and the yogurt-milkfat-oil composition may also lead to a correspondingly higher fat concentration in the Low-Fat Yogurt-Cheese-Oil Composition, which may not be optimal from a consumer health standpoint. It is understood that standardization may be carried out at other points in the process 100, such as following combination of a milkfat fluid, an edible oil and a stabilizer at step 104 or following combination of yogurt with the milkfat-oil composition at step 118, as examples.

In an implementation, a butterfat concentration in a milkfat fluid may be measured using a standard Babcock test. For background, see Baldwin, R. J., "The Babcock Test," Michigan Agricultural College, Extension Division, Bulletin No. 2, Extension Series, March 1916, pp. 1-11; the entirety of which is incorporated herein by reference. Where the butterfat concentration in a milkfat fluid is too high, downward adjustment of the butterfat concentration may be accomplished, as an example, by combining the milkfat fluid with a nonfat ingredient such as skim milk. Introduction of water, as an example, may generally be ineffective because the water concentration of the milkfat fluid may directly affect the texture of the Low-Fat Yogurt-Cheese-Oil Composition. As an example, there may accordingly be a limited feasibility of directly combining water with the milk protein and yogurt-milkfat-oil composition to reduce the overall fat concentration in the Low-Fat Yogurt-Cheese-Oil Composition. In an implementation, the overall fat concentration of a milkfat fluid may be downwardly adjusted by combining an appropriate amount of nonfat dry milk with the milkfat fluid, together with adequate water to rehydrate the nonfat dry milk. This combination of the milkfat fluid with nonfat dry milk has the advantage of not contributing excess water to the milkfat fluid. In the event that the initial butterfat concentration present in a given milkfat fluid needs to be upwardly adjusted, this may be accomplished by combining in an ingredient containing a higher concentration of butterfat, such as, for example, cream.

In an implementation, the relative concentrations of butterfat, milkfat protein, oil, and water to be provided in the Low-Fat Yogurt-Cheese-Oil Composition may all be selected. As an example, the overall fat concentration of the Low-Fat Yogurt-Cheese-Oil Composition may be selected. In an implementation, the overall fat concentration of the Low-Fat Yogurt-Cheese-Oil Composition may be selected to be less than about 17.5% by weight. In another example, the overall milkfat protein concentration of the Low-Fat Yogurt-Cheese-Oil Composition may be maximized due to the nutritional benefits, provided that a good texture and "mouth feel" may be retained. As an additional implementation, a sufficient concentration of an edible oil may be included in the Low-Fat Yogurt-Cheese-Oil Composition to contribute to a texture appealing to the consumer. In an example, an edible oil that may reduce a consumer's serum cholesterol levels may be selected. Milk protein inclusion may increase the overall protein concentration of the Low-Fat Yogurt-Cheese-Oil Composition. Milk protein may be hygroscopic, and its capability to absorb water may tend to degrade the texture of the Low-Fat Yogurt-Cheese-Oil Composition, making the composition somewhat grainy. The edible oil and the yogurt may each counteract this texture degradation and graininess, and may facilitate the preparation of a Low-Fat Yogurt-Cheese-Oil Composition having a texture appealing to the consumer. Water is a secondary ingredient that may be needed both to facilitate processing, as well as to provide an appealing, moist texture in the Low-Fat Yogurt-Cheese-Oil Composition. However, excessive water may not be retained in the Low-Fat Yogurt-Cheese-Oil Composition and hence may become a processing hindrance, an expense, and a disposal issue.

As another implementation, the yogurt-milkfat-oil composition and the milk protein as combined together at step 122 may be blended at step 124 to form a blend. As an example, milk protein may be hygroscopic, and may accordingly have a somewhat crumbly, grainy, sticky, agglomerative texture. The hygroscopicity and crumbly, sticky texture of the milk protein may hinder the formation of a uniform composition at step 122. As an example, blending may accordingly be carried out by subjecting the yogurt-milkfat-oil composition and milk protein to high shear in a suitable vessel equipped with a bladed agitator. In an implementation, the yogurt-milkfat-oil composition and milk protein may be blended by a bladed agitator for a time period within a range of between about 10 minutes and about 20 minutes. In a further implementation, a Breddo Lor liquefier having a 300 gallon capacity and a 75 horsepower motor driving the bladed agitator, or a Breddo Lor liquefier having a 500 gallon capacity and a 110 horsepower motor driving the bladed agitator, may be utilized.

In a further implementation, the yogurt may be combined with the milkfat-oil composition at step 118 as discussed above and the resulting yogurt-milkfat-oil composition may then be homogenized at step 120, prior to combining the milk protein with the yogurt-milkfat-oil composition at step 122. This order of process steps 118-122 may facilitate a breakdown of the crumbly, grainy, agglomerative texture of the milk protein during subsequent blending in step 124. This facilitated breakdown of the milk protein texture and a resulting dispersion of the milk protein throughout the yogurt-milkfat-oil composition may make possible the combination of higher concentrations of milk protein together with the yogurt-milkfat-oil composition. In another implementation, step 118 may be executed after step 124 so that the yogurt may be combined together with the milkfat-oil composition after the combination and blending in of the milk protein. In this latter implementation the absence of the yogurt when step 124 is carried out may lead to poor blending in of the milk protein, possibly necessitating a longer blending cycle as well as imposing a lower ceiling on a maximum concentration of milk protein that may be effectively incorporated into the milkfat-oil composition in steps 122 and 124.

In another implementation, combination of the milkfat fluid with the milk protein as discussed above in connection with step 122 may instead or additionally be carried out in step 104. As an example, the milkfat-oil composition may be homogenized following step 104 in the same manner as discussed above in connection with step 120, and next blended as discussed above in connection with step 124.

As an additional implementation, the blend may be pasteurized at step 126. This pasteurization may, as an example, be carried out in a manner as discussed above in connection with step 106. In a further implementation, the pasteurization may be carried out partially or completely at the same time as the blending in step 124. In an example, a Breddo Lor liquefier or a similar apparatus capable of heating and bladed agitation of the milk protein and the yogurt-milkfat-oil composition may be utilized to carry out both steps 124 and 126. As an implementation, preparation of a Low-Fat Yogurt-Cheese-Oil Composition may be complete following blending and pasteurization at steps 124 and 126. In another example, one or more further steps of the process 100, discussed below, may be carried out.

In an example, the blend may be cooled to a bacteria culture temperature at step 128, the blend may then be combined with live culture bacteria in step 130, and the bacteria may be cultured in step 132. As an implementation, these steps 128-132 may be selected to be carried out when, in an execution of the process 100, the yogurt that was combined with the milkfat-oil composition at step 118 did not contain live culture bacteria. In another example, the blend may be cooled to a yogurt bacteria culture temperature at step 128 in a manner as discussed above in connection with step 240 of the process 200. As a further implementation, live yogurt culture bacteria may be combined with the blend in step 130 in a manner as discussed above in connection with step 250 of the process 200. In an additional example, the bacteria may be cultured in step 132 in a manner as discussed above in connection with step 260 of the process 200. In an implementation, live yogurt bacteria cultures that may themselves provide well-known health benefits to the consumer may be included in the Low-Fat Yogurt-Cheese-Oil Composition.

In another example, the blend may be cooled to a cream cheese bacteria culture temperature at step 128 in a manner as discussed above in connection with step 108 of the process 100. As a further implementation, live cream cheese culture bacteria may be combined with the blend in step 130 in a manner as discussed above in connection with step 110 of the process 100. In an additional example, the bacteria may be cultured in step 132 in a manner as discussed above in connection with step 112 of the process 100. In an implementation, the cream cheese bacteria may not provide the same health benefits that may be provided to the consumer by live yogurt bacteria.

In an implementation, the bacteria culture step 132 may be continued until the pH of the blend is within a range of between about 5.0 and about 4.1. As another example, the bacteria culture step 132 may be continued until the pH of the blend is within a range of between about 4.6 and about 4.4. In a further implementation, the bacteria culture step 132 may be continued until the pH of the blend is about 4.5.

In an implementation, step 132 may include thickening the blend by combining the composition with a coagulating enzyme, in substitution for or in addition to directly acidifying the composition. As an example, a coagulating enzyme may cause casein protein in milk to form a gel. As another implementation, the action of a coagulating enzyme may require much more time for completion than direct acidification, meanwhile allowing far more culture bacteria activity to occur and delaying the completion of acidification. In a further example, the enzyme coagulation process may also be accompanied by syneresis and a resulting loss of albumin protein from the gelled curd. As an implementation, enzyme coagulation may yield an inferior Low-Fat Yogurt-Cheese-Oil Composition having a reduced thickness and a reduced protein concentration. In an example, enzymatic coagulation may take about 12 hours for completion. As an additional implementation, any casein protein coagulating enzyme of animal-, plant-, microbe, or other origin may be used. In another example, the coagulating enzyme may include chymosin, which is also referred to as rennin and is the active component of rennet. Rennet may be purified from calf stomachs. Chymosin may break down casein protein to paracasein. Paracasein may combine with calcium to form calcium paracaseinate, which may then precipitate and form a solid mass. Milkfat and water may become incorporated into the mass, forming curds. One part rennin may coagulate about 10,000 to about 15,000 parts milkfat fluid. In another example, pepsin, which may be purified from the stomachs of grown calves, heifers, or pigs, may be used.

As an example, the pH of the blend may be tested at step 134. In an implementation, the pH of the blend may be measured using a pH meter. As an example, a Fisher Scientific pH meter may be utilized. In an implementation, step 134 may also include adjusting the pH of the blend to a selected value. As another example, the pH of the blend may be adjusted to within a range of between about 5.0 and about 4.1. In a further implementation, the pH of the blend may be adjusted to within a range of between about 4.6 and about 4.4. As an additional example, the pH of the blend may be adjusted to about 4.5. In an implementation, the pH of the blend for preparing a plain flavor Low-Fat Yogurt-Cheese-Oil Composition, meaning one that does not contain or that contains minimal concentrations of fruits, vegetables, nuts, flavorings, condiments or other food additives, may be adjusted to within a range of between about 4.40 and about 4.50. As another example, the pH of the blend for a flavored Low-Fat Yogurt-Cheese-Oil Composition, meaning one that does contain a significant concentration of fruits, vegetables, nuts, flavorings, condiments or other food additives, may be adjusted to within a range of between about 4.38 and about 4.48. In an implementation, the taste to the palate of plain and flavored Low-Fat Yogurt-Cheese-Oil Compositions may begin to become sharp at a pH lower than about 4.40 or 4.38, respectively. In another example, the taste to the palate of either a plain or flavored Low-Fat Yogurt-Cheese-Oil Composition may be too tart at a pH of about 4.2 or lower. In a further implementation, the thicknesses of plain and flavored Low-Fat Yogurt-Cheese-Oil Compositions may decline to a poor body or runniness at a pH higher than about 4.50 or 4.48, respectively.

In an implementation, the pH adjustment of step 134 may be carried out by combining the blend with an appropriate amount of an edible acid. As examples, edible acids may include lactic acid, phosphoric acid, acetic acid, citric acid, and mixtures. In another implementation, an aqueous mixture of edible acids having a pH within a range of between about 0.08 and about 1.4 may be available under the trade name Stabilac® 12 Natural from the Sensient Technologies Corporation, 777 East Wisconsin Avenue, Milwaukee, Wis. 53202-5304. As a further example, similar edible acid mixtures may also be available from Degussa Corporation, 379 Interpace Parkway, P.O. Box 677, Parsippany, N.J. 07054-0677. As an additional implementation, the edible acid selected for use may include lactic acid. Lactic acid is a metabolite that may be naturally produced by lactose-consuming bacteria that may be utilized in preparing the yogurt and the milkfat-oil composition.

In an implementation, an edible acid may be combined with the blend to rapidly reduce the pH of the blend to a selected value, which may serve to control the thickness of the Low-Fat Yogurt-Cheese-Oil Composition. As an additional example, this direct acidification of the blend may slow down further propagation of culture bacteria in the composition, as culture bacteria present in the composition may become substantially dormant at a pH substantially below about 4.38. In an implementation, yogurt culture bacteria may substantially survive direct acidification at step 134 and thus may still provide the health benefits of active yogurt cultures to a consumer. As another example, the edible acid present in the Low-Fat Yogurt-Cheese-Oil Composition may contribute a good-tasting bite to the flavor of the composition.

In an implementation, the pH of the blend may be tested at step 134 following culture of the blend at steps 128-132, and any direct pH adjustment of the blend that is needed may then be promptly completed. As another example, the pH testing and any needed direct acidification may be completed within less than about three (3) hours following combination of the blend with culture bacteria at step 130. In another implementation, pH testing and any needed direct acidification may be completed within less than about two (2) hours following combination of the blend with culture bacteria at step 130. As a further implementation, the pH testing and any needed direct acidification may be completed within less than about one (1) hour following combination of the blend with culture bacteria at step 130. In an example where direct acidification of the blend may be delayed substantially beyond three hours following combination of the blend with culture bacteria at step 130, the thickness of the Low-Fat Yogurt-Cheese-Oil Composition may be correspondingly reduced, and the consistency of the composition may tend to break down with attendant syneresis. In an implementation, excessive culture bacteria activity in the yogurt-milkfat-oil composition may be a substantial contributing cause of these adverse effects.

In another implementation, the pH of the blend may be tested at step 118 following formation of the yogurt-milkfat-oil composition utilizing yogurt including live culture bacteria, and any direct pH adjustment of the blend that is needed may then be promptly completed. As another example, the pH testing and any needed direct acidification may be completed within less than about three (3) hours following preparation of the yogurt-milkfat-oil composition utilizing yogurt including live culture bacteria at step 118. In another implementation, pH testing and any needed direct acidification may be completed within less than about two (2) hours following preparation of the yogurt-milkfat-oil composition at step 118. As a further implementation, the pH testing and any needed direct acidification may be completed within less than about one (1) hour following preparation of the yogurt-milkfat-oil composition utilizing yogurt including live culture bacteria at step 118.

In an implementation, a first point in time T1 when the milkfat-oil composition and the yogurt including live culture bacteria are combined together at step 118 to produce the yogurt-milkfat-oil composition, and a second point in time T2 when the blend may be directly acidified at step 134, may be selected and controlled. In another implementation, a first point in time T1 when the blend may be combined together with culture bacteria at step 130 and a second point in time T2 when the blend may be directly acidified at step 134, may be selected and controlled. As another example, T2 may be a time that is within about three (3) hours or less following T1. In an additional implementation, T2 may be within about two (2) hours or less following T1. As another example, T2 may be within about one (1) hour or less following T1.

In an implementation where the time delay between the first and second points in time T1 and T2 may be selected, monitored and controlled, the time delay may be managed between the point in time of preparation of a given portion of blend or yogurt-milkfat-oil composition including live culture bacteria and the point in time of direct acidification of that same portion. The term "monitored" means that the first and second points in time T1 and T2 may be registered in a suitable manner, which may for example be automated or manual. The term "controlled" means that the time delay between the first and second points in time T1 and T2 may be regulated in a suitable manner, which may for example be automated or manual. As an example, controlling the time delay between T1 and T2 may ensure that a Low-Fat Yogurt-Cheese-Oil Composition prepared from a given portion of blend or yogurt-milkfat-oil composition including live culture bacteria will have a selected texture and shelf life. In an implementation, execution of the process 100 in a continuous manner may facilitate production of a Low-Fat Yogurt-Cheese-Oil Composition having a consistently satisfactory quality, without pockets of thin consistency or of propensity to accelerated spoilage. As another example, execution of the process 100 in a batch manner may facilitate production of a Low-Fat Yogurt-Cheese-Oil Composition batch having a consistently satisfactory quality, rather than resulting in pockets of poor quality or in sub-batches of varying quality. As an example, processing a large batch of blend through step 134 as a series of sub-batches may ensure that no portion of the batch including live culture bacteria awaits direct acidification for more than about three hours.

In an implementation, step 134 may include measures for retarding culture bacteria activity other than or in addition to direct acidification. As an example, the temperature of the blend may be reduced following completion of step 122 to below an optimum temperature zone for rapid bacteria growth. In an implementation, an optimum temperature zone for bacteria growth may be within a range of between about 75° F. and about 115° F. As an example, the process 100 may be carried out to minimize a time period during which the blend and the Low-Fat Yogurt-Cheese-Oil Composition may be exposed to temperatures within this range. In an implementation, such temperature control may permit acidification in step 134 to be delayed for up to about seven (7) hours following preparation of the yogurt-milkfat-oil composition at step 118 or combination of culture bacteria with the blend at step 130.

In an implementation, the pH testing and direct acidification of step 134 may both be carried out together with blending at step 124 and pasteurization at step 126. As an example, a Breddo Lor liquefier may be utilized to blend and pasteurize the milk protein and the yogurt-milkfat-oil composition, as well as to directly acidify the composition. In this manner, step 134 may be carried out during step 124 or as soon as blending in step 124 has been completed. As a further example, steps 124, 126 and 134 may be carried out on a continuous and simultaneous basis. As an example, blending may be discontinued upon reaching a selected pH for the milk protein and the yogurt-milkfat-oil composition, in order to avoid excessive shearing and possible breakdown of the texture of the blend. In an implementation, direct acidification may be carried out at the same temperature range or temperature employed for pasteurization. As a further example, direct acidification may be carried out at a lower temperature than that employed for pasteurization in step 126, although the composition thickness and attendant difficulty of mixing in the direct acidification agent may increase as the temperature is reduced. In an implementation, the temperature of the blend may be reduced to a temperature no greater than a temperature within a range of between about 112° F. and about 114° F. during or after direct acidification in step 134. As an additional example, the temperature of the blend may be reduced to a temperature of less than about 100° F. during or after direct acidification in step 134. In a further implementation, the temperature of the blend may be reduced to a temperature of less than about 75° F. at a point during or after direct acidification in step 134.

As an example, carrying out direct acidification may become gradually more difficult as the temperature of the blend is lowered, due to a steadily increasing composition thickness. In another implementation, direct acidification of the blend at a temperature below about 60° F. may result in a lumpy composition texture. In an example, cooling of the composition may be effected by holding the composition in a jacketed tank containing a glycol refrigerant maintained at a selected temperature to withdraw heat from the blend in the tank. In an additional implementation, the blend may be deemed to be a finished Low-Fat Yogurt-Cheese-Oil Composition after completion of step 134, and may as examples be hot-packed, or cooled and packed, at a selected temperature.

In an implementation, direct acidification of the milk protein and the yogurt-milkfat-oil composition as discussed in connection with step 134 may be carried out before blending the composition in step 124. However, direct acidification may cause a substantial thickening of the composition, which may hinder the blending step. As another example, step 134 may include lowering the temperature of the blend to a temperature suitable for refrigeration, to further reduce ongoing bacteria activity. In an implementation, the temperature may be lowered to within a range of between about 34° F. and about 38° F.

In another implementation, step 134 may include combining a suitable preservative with the blend to retard bacteria, yeast and mold growth. As examples, potassium sorbate, sodium benzoate, sorbic acid, ascorbic acid or nisin may be utilized. In an implementation, the preservative may be combined with the composition before direct acidification and consequent thickening, to facilitate dispersion of the preservative at a minor concentration throughout the blend. Nisin, as an example, is a protein preservative that may be expressed by *Lactococcus lactis*. In an additional implementation, flavorings, condiments and the like may be combined with the blend. As an example, a butter flavoring may be combined with the blend. Butter flavorings may be commercially available, as examples, from Spice Barn Inc., 499 Village Park Drive, Powell, Ohio 43065; and from Kernel Pops of Minnesota, 3311 West 166$^{th}$ Street, Jordan, Minn. 55352, an affiliate of R.D. Hanson & Associates, Inc. In another implementation, a coloring may be combined with the blend. As an example, beta carotene may be utilized as a yellow coloring, which may give the blend a buttery appearance. Adjuvants that may be vulnerable to attack by bacteria, including fruits and vegetables as examples, may in an implementation be combined with the blend after the temperature of the composition has been reduced below about 75° F. In an implementation, such adjuvants may themselves be treated for increased resistance to such bacteria.

In an implementation, live yogurt culture bacteria may be combined with the blend in step 136, provided that the temperature of the blend is low enough at and following such introduction to avoid killing or unduly shocking the live culture bacteria. Step 136 may, as an example, be carried out in a manner as discussed in connection with step 130. As an example, the live yogurt bacteria may reinforce the health-related benefits of live and active yogurt culture bacteria that may already then be present in the blend. In an implementation, a need for inclusion of such live culture bacteria at step 136 as well as a concentration of such bacteria to be combined with a given blend may be determined by carrying out a bacteria activity test. As an example a Man, Rogosa and Sharpe ("MRS") broth test may be carried out.

In an implementation, the blend may be passed through a heat exchanger at one or a plurality of selected and controlled temperatures or temperature ranges in step 138. In a further implementation, a heat exchanger may be used that may continuously move the blend in contact with a heat exchange surface area in a confined space. As an example, this heat exchange step may yield a blend having a creamier, more uniform texture, with a reduced tendency to exhibit syneresis or separation of edible oil or water. In another implementation, this heat exchange step may facilitate incorporation of a higher overall concentration of water into the blend than would otherwise remain stably incorporated. As an example, the heat exchange step may be accompanied by agitation. In another implementation, the blend may be passed through a confined space including a heat exchange surface and having an agitator, and then ejected from the confined space through a opening such as a nozzle. As an implementation, the blend may be passed through a scraped surface heat exchanger, such as a Waukesha Cherry-Burrell Thermutator® or Votator® with agitation while simultaneously controlling the temperature. In another example, a Terlotherm® (vertical scraped surface heat exchanger may be employed. Terlothem® machinery is commercially available from Terlet USA, 6981 North Park Drive, East Bldg., Suite 201, Pennsauken, N.J. 08109. In another implementation, a scraped surface heat exchanger may be equipped to withdraw heat from the blend in order to facilitate reduction of the temperature of the composition in the course of the composition's passage through the heat exchanger. As an additional example, the blend may pass through two scraped surface heat exchangers in series. In an implementation, the two scraped surface heat exchangers may be maintained at two or more different temperatures or temperature ranges.

As an example, the blend may be passed with agitation through a heat exchanger at a temperature within a range of between about 58° F. and about 70° F. In a further implementation, the blend may be passed with agitation through a heat exchanger at a temperature within a range of between about 58° F. and about 68° F. As an additional example, the blend may be passed with agitation through a heat exchanger at a temperature within a range of between about 58° F. and about 62° F. As a further implementation, step 138 may include multiple cooling steps that may reduce the temperature of the blend in a staged, controlled manner. As examples, this cooling may be carried out with a smooth and gradual temperature reduction or in discrete steps. In an implementation, the blend may be cooled to a temperature no higher than about 90° F. before being packed into containers. As an example, the blend may be too sticky at a temperature higher than about 100° F. in order to be efficiently packed.

In an implementation, the agitation of the blend in a scraped surface heat exchanger may be controlled to a selected level in order to subject the blend to a selected amount of shear. As an example, the normal operating speed of the agitator in a Waukesha Cherry-Burrell Thermutator® or Votator® may need to be reduced, for example to within a range of between about 800 and 1,000 revolutions per minute, in order to avoid excessive shear. As an example, the process 100 may end at step 140 after completion of some or all of steps 104-138. In another implementation (not shown), the blend may be cooled in step 138 to a temperature suitable for culture bacteria survival, before combining live bacteria with the blend in the same manner as discussed above in connection with step 136.

In an implementation, the Low-Fat Yogurt-Cheese-Oil Composition prepared by the process 100 may have the appearance, consistency, and texture of a cheese or butter product. As an example, the texture of the Low-Fat Yogurt-Cheese-Oil Composition may be similar to that of cream cheese, or of another soft cheese. In another implementation, the texture of the Low-Fat Yogurt-Cheese-Oil Composition may be similar to that of butter or margarine, in brick or spread form. As an additional example, the Low-Fat Yogurt-Cheese-Oil Composition may have the robust, appealing flavor of yogurt. In a further implementation, the Low-Fat Yogurt-Cheese-Oil Composition may include whey protein retained from the milkfat fluid discussed above in connection with step 104. As a further example, retained whey protein may amplify the flavor of the Low-Fat Yogurt-Cheese-Oil Composition and provide a robust taste. In an implementation, facilitating retention of the whey in the Low-Fat Yogurt-Cheese-Oil Composition prepared by the process 100 may introduce natural flavor while eliminating the pollution and economic loss that may result from separating and discarding whey protein as in conventional cheese production. As an additional example, the Low-Fat Yogurt-Cheese-Oil Composition may include an edible oil, which may improve the spreadability of and provide a creamy texture to the composition. In an implementation, the Low-Fat Yogurt-Cheese-Oil Composition may have lower concentrations of cholesterol and sodium than does conventional cream cheese.

In an implementation, Low-Fat Yogurt-Cheese-Oil Composition may have an overall fat concentration within a range of between about 10% and about 40% by weight. As another example, the Low-Fat Yogurt-Cheese-Oil Composition may have an overall fat concentration within a range of between about 17% and about 25% by weight. In a further implementation, the Low-Fat Yogurt-Cheese-Oil Composition may have an overall fat concentration within a range of between about 20% and about 21% by weight. As an additional example, the Low-Fat Yogurt-Cheese-Oil Composition may have an overall fat concentration of about 20.71% by weight. In an implementation where the Low-Fat Yogurt-Cheese-Oil Composition may include butterfat, edible oil and yogurt, the yogurt itself may be substantially fat-free or may have a low concentration of fat, so that the yogurt reduces the overall fat concentration of the Low-Fat Yogurt-Cheese-Oil Composition.

In an implementation, the Low-Fat Yogurt-Cheese-Oil Composition may include yogurt at a concentration within a range of between about 30% and about 10% by weight. As a further example, the Low-Fat Yogurt-Cheese-Oil Composition may include yogurt at a concentration within a range of between about 22% and about 18% by weight. As an additional example, the Low-Fat Yogurt-Cheese-Oil Composition may include yogurt at a concentration of about 20% by weight.

As an implementation, the Low-Fat Yogurt-Cheese-Oil Composition may include butterfat at a concentration within a range of between about 17.5% and about 6% by weight. In another example, the Low-Fat Yogurt-Cheese-Oil Composition may include butterfat at a concentration within a range of between about 12% and about 9% by weight. In yet another implementation, the Low-Fat Yogurt-Cheese-Oil Composition may include butterfat at a concentration of about 10.71% by weight.

As an implementation, the Low-Fat Yogurt-Cheese-Oil Composition may include milk protein at a concentration within a range of between about 30% and about 5% by weight. In another example, the Low-Fat Yogurt-Cheese-Oil Composition may include milk protein at a concentration within a range of between about 12% and about 7% by weight. As an additional implementation, the Low-Fat Yogurt-Cheese-Oil Composition may include milk protein at a concentration of about 10% by weight.

As an implementation, the Low-Fat Yogurt-Cheese-Oil Composition may include an oil at a concentration within a range of between about 20% and about 5% by weight. In another example, the Low-Fat Yogurt-Cheese-Oil Composition may include an oil at a concentration within a range of between about 12% and about 9% by weight. As an additional implementation, the Low-Fat Yogurt-Cheese-Oil Composition may include milk protein at a concentration of about 10% by weight.

In an implementation, of the overall protein content in the Low-Fat Yogurt-Cheese-Oil Composition, a proportion within a range of between about 35% and about 63% by weight may be contributed by milk protein combined with other ingredients during step 104, a proportion within a range of between about 63% and about 35% by weight may be contributed by milk protein combined with other ingredients during step 122, and a proportion within a range of between about 10% and about 2% by weight may be contributed by yogurt combined with other ingredients during step 118. As another example, of the overall protein content in the Low-Fat Yogurt-Cheese-Oil Composition, a proportion within a range of between about 42% and about 48% by weight may be contributed by milk protein combined with other ingredients during step 104, a proportion within a range of between about 48% and about 42% by weight may be contributed by milk protein combined with other ingredients during step 122, and a proportion within a range of between about 6% and about 4% by weight may be contributed by yogurt combined with other ingredients during step 118. In an additional implementation, of the overall protein content in the Low-Fat Yogurt-Cheese-Oil Composition, about 46% by weight may be contributed by milk protein combined with other ingredients during step 104, about 49% by weight may be contributed by milk protein combined with other ingredients during step 122, and about 5% by weight may be contributed by yogurt combined with other ingredients during step 118. As another example, a selected proportion of milk protein in the Low-Fat Yogurt-Cheese-Oil Composition contributed by milk protein combined at step 122 may be greater than a selected proportion of milk protein in the Low-Fat Yogurt-Cheese-Oil Composition contributed by milk protein combined at step 104.

In an example, the Low-Fat Yogurt-Cheese-Oil Composition may include cholesterol at a concentration within a range of between about 0.05% and about 0.09% by weight. As a further implementation, the Low-Fat Yogurt-Cheese-Oil Composition may include sodium at a concentration within a range of between about 0.2% and 0.4% by weight. In another example, the Low-Fat Yogurt-Cheese-Oil Composition may include water at a concentration within a range of between about 58% and about 63% by weight.

In an implementation, the Low-Fat Yogurt-Cheese-Oil Composition may include inulin. Inulin is a polysaccharide that may naturally be found in many plants. Inulin has a mildly sweet taste and is filling like starchy foods, but may not normally be absorbed in human metabolism and therefore may not affect the sugar cycle. Inulin may reduce the human body's need to produce insulin, which may help to restore a normal insulin level. In addition to being thus potentially beneficial for diabetics, inulin may increase the thickness of the Low-Fat Yogurt-Cheese-Oil Composition, which may facilitate the incorporation of as much as between about 2% and about 4% by weight more yogurt into a given Low-Fat Yogurt-Cheese-Oil Composition. Inulin also is a prebiotic that may extend the viability of yogurt bacteria in the digestive tract of the consumer, so that the beneficial effects of such bacteria in the body may be increased. Inulin may, however, be implicated in food allergies, and may induce anaphylactic shock in some people. In an implementation, other non-digestible oligosaccharides and oligosaccharides that may be resistant to human metabolism, collectively referred to herein as "digestion-resistant polysaccharides", such as lactulose and lactitol, may be utilized instead of or together with inulin. As an example, a minor concentration of a digestion-resistant polysaccharide may be combined with the yogurt-milkfat-oil composition at or before blending step 124.

Syneresis may lead to an unattractive and wasteful phase separation between curds and whey when milk is directly coagulated. In an implementation, the Low-Fat Yogurt-Cheese-Oil Composition may exhibit substantially no syneresis, or less than about 1% by weight syneresis by weight, after being maintained at a temperature within a range of between about 74° F. to about 75° F. for about 15 hours.

As an implementation, the texture and consistency of the Low-Fat Yogurt-Cheese-Oil Composition may be the same as that of ordinary cream cheese. In another example, the Low-Fat Yogurt-Cheese-Oil Composition may have a consistency similar to that of brick butter.

Figure 3:
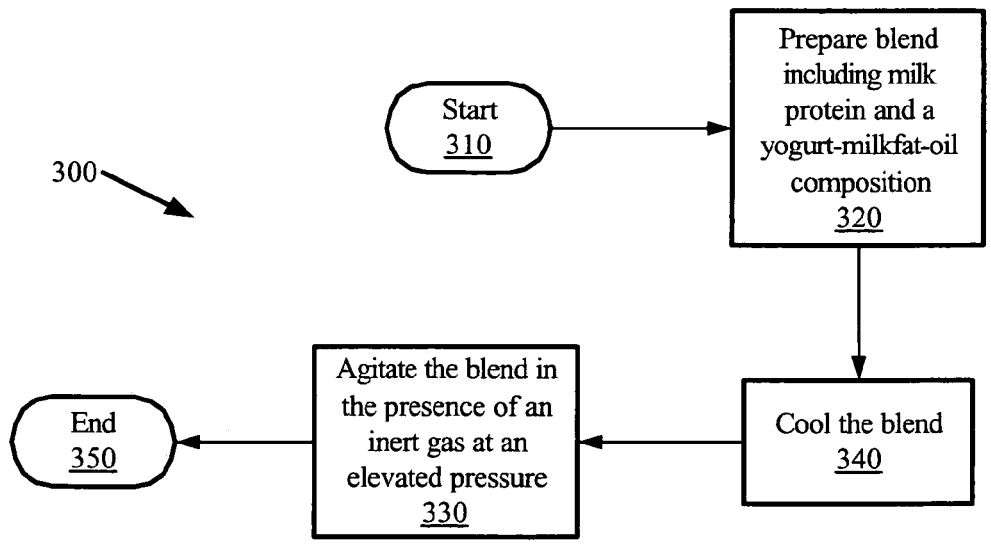
FIG. 3 is a flow chart showing an example of an implementation of a process 300 for preparing a whipped Low-Fat Yogurt-Cheese-Oil Composition.

FIG. 3 is a flow chart showing an example of an implementation of a process 300 for preparing a whipped Low-Fat Yogurt-Cheese-Oil Composition. In an implementation, the process 300 may be carried out in place of step 138 discussed above. The process 300 starts at step 310, and at step 320 a blend including a milk protein and a yogurt-milkfat-oil composition (a "blend") may be prepared by carrying out some or all of steps 104-136 of the process 100. In step 330, the blend may be agitated in the presence of an inert gas at an elevated pressure. As an example, the blend may be passed through a confined space having an agitator, while being simultaneously subjected to an inert gas at an elevated pressure.

In an implementation, an inert gas may be provided in the confined space at an initial pressure within a range of between about 150 PSI and about 240 PSI. As another example, the inert gas may be provided in the confined space at an initial pressure within a range of between about 220 PSI and about 240 PSI. As a further implementation, the pressure of the inert gas may be controlled throughout the confined space in order to expose the blend to a selected pressure for a defined time as the composition travels through the confined space. In an additional example, the inert gas may be injected into the confined space at a selected initial pressure, which may then be permitted to dissipate in the confined space. As an implementation, the blend may be exposed to a selected pressure for a time period within a range of between about 3 seconds and about 6 seconds. As another example, the blend may be exposed to a selected pressure for a time period within a range of between about 4 seconds and about 5 seconds. Although as examples any inert gas may be used, nitrogen may in an implementation be a typical and practical choice. The term "inert" means that the gas substantially does not cause or at least minimizes harmful effects on the blend, its preparation, and the consumer.

In an implementation, injection of a gas into the blend under high pressure may be problematic due to an extreme density mismatch between the gas and the blend. As an example, the blend may resist diffusion of the gas into the composition. In an implementation, diffusion of the gas throughout the blend may not be instantaneous or rapid even under agitation. As an example, dispersion of the gas throughout the blend in a reasonable time may require a gas delivery pressure that is substantially above a pressure that would be sufficient for equilibration with the prevailing pressure within the blend. This resistance to gas dispersion in the blend may be ameliorated, as an example, by employing an in-line gas injection system providing controllable gas injection pressure. In an implementation, such an in-line gas injection system may have a relatively large bore gas delivery orifice. A mass flow controller such as, for example, a GFC-171S mass flow controller commercially available from Aalborg Instruments & Controls, Inc., 20 Corporate Drive, Orangeburg, N.Y. 10962, may be used.

In an implementation, the temperature of the blend may be reduced by cooling the blend at step 340 in advance of step 330, and so maintained or further cooled during step 330. As an example, a scraped surface heat exchanger as earlier discussed may be used to provide the needed agitation during step 330 while simultaneously reducing the temperature. As another implementation, the temperature of the blend may be reduced to a suitable inert gas injection temperature at step 340, and may then be so maintained or further reduced during step 330. The temperature reduction at step 340 may, as an example, increase the retention of the inert gas in the blend during subsequent step 330. In the absence of such a temperature reduction at step 340 before injection of the inert gas at step 330, excessive escape of the inert gas from the blend prior to or during step 330 may as an example retard the whipping process and result in a Low-Fat Yogurt-Cheese-Oil Composition having an inadequately whipped texture. In an implementation, the blend may be cooled at step 340 to an inert gas injection temperature within a range of between about 65° F. and about 68° F., and agitation in the presence of the inert gas at an elevated pressure may then be carried out at a temperature within a range of between about 58° F. and about 62° F. within a confined space at step 330. In another implementation, the blend may be cooled at step 340 to a whipping temperature within a range of between about 65° F. and about 90° F. As an example, using a temperature above about 90° F. at step 340 may counteract the effect of the pressurized gas in causing the blend to expand into a whipped form. As another example, the blend may be cooled to a whipping temperature of no higher than about 80° F. at step 340. In an implementation, a temperature within a range of between about 58° F. and about 70° F. may then be employed within the confined space at step 330. In another example, a temperature within a range of between about 58° F. and about 68° F. may be employed within the confined space at step 330. Either or both of steps 340 and 330 may as examples include multiple cooling steps that may reduce the temperature of the blend in a staged, controlled manner. This cooling may be carried out, as examples, with a smooth and gradual temperature reduction or in discrete steps. In an implementation, the agitation within a confined space such as a scraped surface heat exchanger may be controlled to a selected level in order to maintain the blend within the scraped surface heat exchanger for an adequate time for the pressurized inert gas to act on the composition. As another example, the blend may pass through two scraped surface heat exchangers in series as earlier discussed. The process 300 may then end at step 350.

The resulting product may be a whipped Low-Fat Yogurt-Cheese-Oil Composition. The texture and consistency of the Low-Fat Yogurt-Cheese-Oil Composition may be, as an example, the same as that of ordinary cream cheese. In another implementation, the texture and consistency of the Low-Fat Yogurt-Cheese-Oil Composition may be the same as that of whipped butter. As another implementation, solid adjuvants such as fruits, vegetables and nuts may be combined with the Low-Fat Yogurt-Cheese-Oil Composition after the whipping process 300 has been completed.

It is understood that the orders of some of the steps in the processes 100, 200 and 300 may be changed, and that some steps may be omitted. As examples, bacteria culture steps 108-112 and pasteurization step 106, bacteria culture steps 128-132, and bacteria introduction step 136 may be omitted. In another implementation, pasteurization step 114 may be omitted provided that pasteurization step 126 is executed. As a further example, milk protein combination step 122 may be carried out prior to homogenization step 120 or prior to yogurt combination step 118 or both, although these modifications may increase the difficulty of completing the milk protein combination step and may yield a Low-Fat Yogurt-Cheese-Oil Composition having a thin texture lacking in body. As a further implementation, the milkfat-oil fluid may not be homogenized until after its combination with yogurt at step 118, as shown in FIG. 1. In another example, temperature adjustment step 116 may be omitted. Homogenization of the milkfat-oil fluid at an earlier point in the process 100 may be unnecessary and may merely subject the milkfat-oil fluid to extra processing damage, time and expense while not substantially contributing to the quality of the Low-Fat Yogurt-Cheese-Oil Composition. In another implementation, stabilizer combination may alternatively be carried out following step 104 but prior to pasteurization at step 114, or at a later point in the process 100. Carrying out stabilizer combination after yogurt combination step 118 may necessitate more difficulty in handling the yogurt-milkfat-oil composition, which may accordingly have a thinner consistency. As an additional example, pH testing and adjustment step 134 may be omitted. As a further example, pre-prepared yogurt not necessarily made according to the process 200 may be utilized. It is further understood that whipping of a blend according to the process 300 may be omitted.

EXAMPLE 1

A batch of 1,500 pounds of pre-pasteurized heavy cream having a butterfat content of 44% by weight is pumped into a kettle equipped with a heater and an agitator. Vegetable oil in an amount of 600 pounds is added to the heavy cream. After 15 minutes of agitation, 21.6 pounds of K6B493 stabilizer, 279.6 pounds of nonfat dry milk and 599 pounds of water are added to the cream with agitation to thicken the mixture. In addition, 294 pounds of a milk protein-whey protein composition are added to the mixture. The composition includes 57% by weight of Simplesse®100 microparticulated whey protein concentrate having about 53.2% plus or minus 2% by weight of protein, commercially available from CP Kelco; and 43% by weight of a skim milk protein concentrate having about 42% by weight of protein. Sodium chloride in an amount of 24.6 pounds is added to the heavy cream. The cream is then pasteurized by heating it with agitation to 165° F. and holding at that temperature for 15 minutes. The cream is then cooled with agitation to 85° F., whereupon 500 milligrams of phage Control™ 604 cream cheese culture bacteria are added to the cream with agitation for 15 minutes. The cream is then maintained at 85° F. for 75 minutes. The cream is then pasteurized again by heating it with agitation to 165° F. and holding at that temperature for 15 minutes. The temperature of the resulting milkfat-oil composition is adjusted down to 130° F. Approximately 14% by weight of the protein content in this milkfat-oil composition is derived from the cream.

Meanwhile, yogurt is separately and simultaneously prepared. A batch of 792 pounds of condensed nonfat milk having a solids content of 33% by weight is provided. The solids content is adjusted to about 22% by weight, by addition of 408 pounds of water. The condensed milk is then pasteurized by heating it with agitation to 165° F. and holding at that temperature for 15 minutes. The temperature of the condensed milk is then adjusted to 108° F., whereupon 250 milligrams of F-DVS YoFast®-10 yogurt culture bacteria are added to the condensed milk with agitation for 15 minutes. The condensed milk is then maintained at 108° F. for 6 hours. The resulting yogurt is then ready for combination with the milkfat-oil composition.

Next, 1,200 pounds of the prepared yogurt are mixed into 3,319 pounds of the milkfat-oil composition with agitation. The resulting yogurt-milkfat-oil composition is cooled to a temperature of 125° F., and then homogenized by subjecting the mixture to a pressure of about 3,000 PSI at a temperature of 125° F. for about 5 seconds. Next, 1,470 pounds of a milk protein composition including about 20% by weight of protein are then blended for about 10 to about 20 minutes with the yogurt-milkfat-oil composition in a Breddo Lor Heavy Duty 2200 RPM Likwifier® apparatus having a 500 gallon tank with a bladed agitator driven by a 110 horsepower motor. The temperature of the blend is gradually raised in the Breddo Lor agitator tank to about 165° F. and maintained at that temperature for 15 minutes to pasteurize the composition. The temperature of the blend is then adjusted to 108° F., whereupon 250 milligrams of F-DVS YoFast®-10 yogurt culture bacteria are added to the blend with agitation for 15 minutes. The blend is then maintained at 108° F. for 6 hours. The pH of the blend is then tested, and the composition is acidified to a pH of about 4.5 by addition of 57.5 pounds of Stabilac® 12 Natural acid. The blend is then passed through a Waukesha Cherry-Burrell Thermutator® scraped surface heat exchanger with agitation for a residence time of about 5 seconds at a temperature within a range of between about 58° F. and about 62° F.

The resulting Low-Fat Yogurt-Cheese-Oil Composition may include about 10.71% by weight of butterfat; about 10% by weight of oil, about 10% by weight of milk protein; about 0.0359% by weight of cholesterol; about 0.211% by weight of sodium; about 57% by weight of water; and about 43% by weight of solids. The protein content of this Low-Fat Yogurt-Cheese-Oil Composition may include approximately: 41% by weight derived from the nonfat dry milk together with the stabilizer; 5% by weight derived from the cream; 48.7% by weight derived from the milk protein composition, and 5% by weight derived from the yogurt. The Low-Fat Yogurt-Cheese-Oil Composition may yield substantially no syneresis after 15 hours at about 74° F. to about 75° F.

EXAMPLE 2

A batch of 1,335 pounds of pre-pasteurized heavy cream having a butterfat content of 44% by weight is pumped into a kettle equipped with a heater and an agitator. Vegetable oil in an amount of 536 pounds is added to the heavy cream. Sodium chloride in an amount of 21.93 pounds is added to the heavy cream. After 15 minutes of agitation, 19.26 pounds of K6B493 stabilizer, 249 pounds of nonfat dry milk and 534 pounds of water are added to the cream with agitation to thicken the mixture. In addition, 262 pounds of a milk protein-whey protein composition are added to the mixture. The composition includes 57% by weight of Simplesse®100 microparticulated whey protein concentrate having about 54% by weight of protein, commercially available from CP Kelco; and 43% by weight of a skim milk protein concentrate having about 42% by weight of protein. The cream is then pasteurized by heating it with agitation to 165° F. and holding at that temperature for 15 minutes. The cream is then cooled with agitation to 85° F., whereupon 500 milligrams of pHage Control™ 604 cream cheese culture bacteria are added to the cream with agitation for 15 minutes. The cream is then maintained at 85° F. for 75 minutes. The cream is then pasteurized again by heating it with agitation to 165° F. and holding at that temperature for 15 minutes. The temperature of the resulting milkfat-oil composition is adjusted down to 128° F. Approximately 14% by weight of the protein content in this milkfat-oil composition is derived from the cream; the balance being derived from the nonfat dry milk and the milk protein-whey protein composition.

Meanwhile, yogurt is separately and simultaneously prepared in the same manner as discussed in connection with Example 1. Next, 1,071 pounds of the prepared yogurt is mixed into 2,957 pounds of the milkfat-oil composition with agitation. The resulting yogurt-milkfat-oil composition is cooled to a temperature of 125° F., and then homogenized by subjecting the mixture to a pressure of about 3,000 PSI at a temperature of 125° F. for about 5 seconds. Next, 1,312 pounds of a milk protein composition including about 20% by weight of protein are then blended for about 10 to about 20 minutes with the yogurt-milkfat-oil composition in a Breddo Lor Heavy Duty 2200 RPM Likwifier® apparatus having a 500 gallon tank with a bladed agitator driven by a 110 horsepower motor. The temperature of the blend is gradually raised in the Breddo Lor agitator tank to about 165° F. and maintained at that temperature for 15 minutes to pasteurize the composition. The temperature of the blend is then adjusted to 108° F., whereupon 250 milligrams of F-DVS YoFast®-10 yogurt culture bacteria are added to the blend with agitation for 15 minutes. The blend is then maintained at 108° F. for 6 hours. The pH of the blend is then tested, and the composition is acidified to a pH of about 4.5 by addition of 25 pounds of Stabilac® 12 Natural acid. The blend is then passed through a Waukesha Cherry-Burrell Thermutator® scraped surface heat exchanger with agitation for a residence time of about 5 seconds at a temperature within a range of between about 58° F. and about 62° F.

The resulting Low-Fat Yogurt-Cheese-Oil Composition may include about 10.71% by weight of butterfat; about 10% by weight of oil, about 10% by weight of milk protein; about 0.0359% by weight of cholesterol; about 0.211% by weight of sodium; about 57% by weight of water; and about 43% by weight of solids. The protein content of this Low-Fat Yogurt-Cheese-Oil Composition may include approximately: 41% by weight derived from the nonfat dry milk together with the stabilizer; 5% by weight derived from the cream; 48.7% by weight derived from the milk protein composition, and 5% by weight derived from the yogurt. The Low-Fat Yogurt-Cheese-Oil Composition may yield substantially no syneresis after 15 hours at about 74° F. to about 75° F.

Although the invention has been described with reference to particular examples of implementations, it will be apparent to those skilled in the art that various changes and modifications can be made without departing from the scope of the invention. Such changes and modification are intended to be covered by the appended claims.

What is claimed is:

1. A process, comprising:
providing a pasteurized milkfat-oil composition including a milkfat fluid and an edible oil;
causing a pH of the milkfat-oil composition to be slightly reduced, by inoculating the milkfat-oil composition with lactic acid—producing bacteria, and then culturing the bacteria to produce lactic acid in and to slighty thicken the milkfat-oil composition, and then pasteurizing the milkfat-oil composition before the bacteria substantially digest the milkfat-oil composition;
combining together and homogenizing a yogurt and the milkfat-oil composition to form a homogenized yogurt-milkfat-oil composition;
combining milk protein with the homogenized yogurt-milkfat-oil composition;
forming a blend having a pH and including the milk protein and the homogenized yogurt-milkfat-oil composition; and
acidifying the blend, reducing the pH of the blend to within a range of between about 5.0 and about 4.1; thereby forming a low-fat yogurt-milkfat-oil composition.

2. The process of claim 1, including combining milk protein with the milkfat-oil composition.

3. The process of claim 1, in which the milkfat fluid includes butterfat at a concentration within a range of between about 52% by weight and about 10% by weight; protein at a concentration of about 2% by weight; and water at a concentration within a range of between about 40% by weight and about 70% by weight.

4. The process of claim 1, in which the edible oil includes a vegetable oil derived from seeds or fruit of soy, corn, canola, sunflower, safflower, olive, peanut, cottonseed, sesame, almond, apricot, avocado, coconut, flax, grapeseed, hazelnut, palm, pine, poppy, pumpkin, rice bran, tea, walnut, or wheat.

5. The process of claim 1, in which the milkfat-oil composition includes a milkfat fluid at a concentration within a range of between about 97% by weight and about 30% by weight, and an edible oil at a concentration within a range of between about 3% by weight and about 70% by weight.

6. The process of claim 1, in which the yogurt-milkfat-oil composition includes the yogurt at a concentration within a range of between about 50% by weight and about 10% by weight, and the milkfat-oil composition at a concentration within a range of between about 50% by weight and about 90% by weight.

7. The process of claim 1, in which the yogurt includes:
butterfat at a concentration within a range of between about 0% and about 3.25% by weight;
milk protein at a concentration within a range of between about 3% by weight and about 6% by weight; and
water at a concentration within a range of between about 76% by weight and about 88% by weight.

8. The process of claim 1, in which the blend includes milk protein at a concentration within a range of between about 45% by weight and about 15% by weight, and the yogurt-milkfat-oil composition at a concentration within a range of between about 55% by weight and about 85% by weight.

9. The process of claim 1, including incorporating in the blend non-digestible oligosaccharide or a digestion-resistant polysaccharide.

10. The process of claim 1, including incorporating inulin, lactulose or lactitol in the low-fat yogurt-milkfat-oil composition.

11. The process of claim 1, wherein providing the pasteurized milkfat-oil composition includes providing a pasteurized composition that contains whole milk, cream, skim milk, or reconstituted dry milk.

12. The process of claim 1, wherein inoculating the milkfat-oil composition with lactic acid—producing bacteria includes inoculating the milkfat-oil composition with mesophilic lactic acid-producing bacteria.

13. The process of claim 12, wherein inoculating the milkfat-oil composition with mesophilic lactic acid—producing bacteria includes inoculating the milkfat-oil composition with mesophilic lactic acid—producing bacteria being of a strain that includes *Lactococcus lactic lactis, Lactococcus lactis cremoris, Lactococcus lactis diacetylactis*, or *Leuconostoc*.

14. The process of claim 1, wherein acidifying the blend includes inoculating the blend with live and active lactic acid-producing yogurt bacteria, and then culturing the lactic acid-producing yogurt bacteria to produce lactic acid in the blend until the pH of the blend is reduced to one point within the range of between about 5.0 and about 4.1.

15. The process of claim 14, wherein acidifying the blend includes causing the pH of the blend to be further reduced to another point within the range being lower than the one point, by combining, with the blend, an edible acid supplementing the lactic acid produced by the yogurt bacteria.

16. The process of claim 15, wherein causing the pH of the blend to be further reduced to another point includes reducing the pH to within a further range of between about 4.6 and about 4.4.

17. The process of claim 14, wherein inoculating the blend with live and active lactic acid-producing yogurt bacteria includes combining the milkfat-oil composition with yogurt containing live and active lactic acid-producing yogurt bacteria.

18. The process of claim. 14, wherein inoculating the blend with live and active lactic acid-producing yogurt bacteria includes inoculating the blend with live and active probiotic lactic acid- producing yogurt bacteria being of a strain that includes *Lactobacillus delbrueckii* subspecies *bulgaricus, Streptococcus thermophilus, Lactobacillus acidophilus, Bifidobacterium*, or *Lactobacillus paracasei* subspecies *casei*.

19. The process of claim 14, wherein inoculating the milkfat-oil composition with lactic acid—producing bacteria includes inoculating the milkfat-oil composition with mesophilic lactic acid—producing bacteria.

20. The process of claim 19, wherein inoculating the milkfat-oil composition with mesophilic lactic acid—producing bacteria includes inoculating the milkfat-oil composition with mesophilic lactic acid—producing bacteria being of a strain that includes *Lactococcus lactis lactis, Lactococcus lactis cremoris, Lactococcus lactis diacetylactis*, or *Leuconostoc*.

21. The process of claim 20, wherein providing the pasteurized milkfat-oil composition includes providing a pasteurized composition that contains whole milk, cream, skim milk, or reconstituted dry milk.

22. The process of claim 1, wherein the causing a pH of the milkfat-oil composition to be slightly reduced includes carrying out the pasteurizing after carrying out the culturing of the bacteria for a time period within a range of between about 60 minutes and about 90 minutes.

23. The process of claim 1, wherein acidifying the blend includes combining an edible acid with the blend.

* * * * *